United States Patent
Egenolf et al.

(10) Patent No.: US 11,423,083 B2
(45) Date of Patent: Aug. 23, 2022

(54) TRANSFORMING A SPECIFICATION INTO A PERSISTENT COMPUTER PROGRAM

(71) Applicant: Ab Initio Technology LLC, Lexington, MA (US)

(72) Inventors: Jonah Egenolf, Winchester, MA (US); Marshall A. Isman, Newton, MA (US); Frederic Wild, Cumberland, RI (US)

(73) Assignee: Ab Initio Technology LLC, Lexington, MA (US)

( * ) Notice: Subject to any disclaimer, the term of this patent is extended or adjusted under 35 U.S.C. 154(b) by 170 days.

(21) Appl. No.: 15/795,917

(22) Filed: Oct. 27, 2017

(65) Prior Publication Data
US 2019/0130048 A1 May 2, 2019

(51) Int. Cl.
*G06F 16/901* (2019.01)
*G06F 16/26* (2019.01)
*G06F 8/34* (2018.01)
*G06F 8/10* (2018.01)
*G06F 16/25* (2019.01)

(52) U.S. Cl.
CPC ............ *G06F 16/9024* (2019.01); *G06F 8/10* (2013.01); *G06F 8/34* (2013.01); *G06F 16/258* (2019.01); *G06F 16/26* (2019.01)

(58) Field of Classification Search
CPC .... G06F 16/9024; G06F 16/26; G06F 16/258; G06F 8/10; G06F 8/34
See application file for complete search history.

(56) References Cited

U.S. PATENT DOCUMENTS

| 4,901,221 A | 2/1990 | Kodosky et al. |
| 4,914,568 A | 4/1990 | Kodosky et al. |
| 5,291,587 A | 3/1994 | Kodosky et al. |

(Continued)

FOREIGN PATENT DOCUMENTS

| CN | 1961313 | 5/2007 |
| CN | 101000621 | 7/2007 |

(Continued)

OTHER PUBLICATIONS

Chinese Office Action, with English Translation, application No. 2010800638065, dated Sep. 29, 2015, 28 pages.

(Continued)

*Primary Examiner* — Alford W Kindred
*Assistant Examiner* — Lin Lin M Htay
(74) *Attorney, Agent, or Firm* — Fish & Richardson P.C.

(57) ABSTRACT

A method performed by a computer system including: accessing a specification that specifies a plurality of modules to be implemented by the computer program for processing the one or more values of the one or more fields in the structured data item; transforming the specification into the computer program that implements the plurality of modules, wherein the transforming includes: for each of one or more first modules of the plurality of modules: identifying one or more second modules of the plurality of modules that each receive input that is at least partly based on an output of the first module; and formatting an output data format of the first module such that the first module outputs only one or more values of one or more fields of the structured data item.

30 Claims, 18 Drawing Sheets

(56) References Cited

U.S. PATENT DOCUMENTS

| | | | |
|---|---|---|---|
| 5,301,301 A | 4/1994 | Kodosky et al. |
| 5,301,336 A | 4/1994 | Kodosky et al. |
| 5,438,659 A | 8/1995 | Notess et al. |
| 5,481,741 A | 1/1996 | McKaskle et al. |
| 5,844,554 A | 12/1998 | Geller et al. |
| 5,966,072 A | 10/1999 | Stanfill et al. |
| 6,064,812 A | 5/2000 | Parthasarathy et al. |
| 6,102,965 A | 8/2000 | Dye et al. |
| 6,173,438 B1 | 1/2001 | Kodosky et al. |
| 6,219,628 B1 | 4/2001 | Kodosky et al. |
| 6,300,948 B1 | 10/2001 | Geller |
| 6,437,805 B1 | 8/2002 | Sojoodi et al. |
| 6,694,321 B1 | 2/2004 | Bemo |
| 6,763,515 B1 | 7/2004 | Vazquez et al. |
| 6,801,229 B1 | 10/2004 | Tinkler |
| 7,120,876 B2 | 10/2006 | Washington et al. |
| 7,164,422 B1 | 1/2007 | Wholey et al. |
| 7,167,850 B2 | 1/2007 | Stanfill |
| 7,281,018 B1 | 10/2007 | Begun |
| 7,353,464 B1 | 4/2008 | Kundu |
| 7,533,347 B2 | 5/2009 | Santori et al. |
| 7,624,375 B2 | 11/2009 | Santori et al. |
| 7,701,869 B2 | 4/2010 | Hogan |
| 7,716,630 B2 | 5/2010 | Wholey et al. |
| 7,756,907 B2 | 7/2010 | Stolte et al. |
| 7,895,586 B2 | 2/2011 | Ozone |
| 7,937,665 B1 | 5/2011 | Vazquez et al. |
| 8,146,007 B2 | 3/2012 | Ramamoorthy et al. |
| 8,156,481 B1 | 4/2012 | Koh et al. |
| 8,380,651 B2 | 2/2013 | Gould et al. |
| 8,386,408 B2 | 2/2013 | Gould et al. |
| 9,323,824 B2 | 4/2016 | Vigneau |
| 10,845,962 B2 | 11/2020 | Farver et al. |
| 2001/0020291 A1 | 9/2001 | Kudukoli et al. |
| 2001/0024211 A1 | 9/2001 | Kudukoli et al. |
| 2001/0034733 A1 | 10/2001 | Prompt et al. |
| 2001/0047402 A1 | 11/2001 | Saimi et al. |
| 2002/0078349 A1* | 6/2002 | Marso ............... G06F 9/541 |
| | | 713/166 |
| 2002/0170042 A1 | 11/2002 | Do et al. |
| 2003/0110464 A1* | 6/2003 | Davidson ............ G06F 30/30 |
| | | 716/117 |
| 2003/0172193 A1 | 9/2003 | Olsen |
| 2003/0174165 A1 | 9/2003 | Barney |
| 2003/0195867 A1 | 10/2003 | Nye |
| 2004/0015783 A1 | 1/2004 | Lennon et al. |
| 2004/0030993 A1 | 2/2004 | Hong Huey et al. |
| 2004/0034848 A1 | 2/2004 | Moore et al. |
| 2004/0044912 A1 | 3/2004 | Connary et al. |
| 2004/0093342 A1 | 5/2004 | Arbo |
| 2004/0181543 A1 | 9/2004 | Wu et al. |
| 2004/0187079 A1 | 9/2004 | Yamada |
| 2004/0210445 A1 | 10/2004 | Veronese |
| 2004/0239674 A1 | 12/2004 | Ewald et al. |
| 2005/0060647 A1 | 3/2005 | Doan et al. |
| 2005/0066285 A1 | 3/2005 | Santori et al. |
| 2005/0091251 A1* | 4/2005 | Ramarao ............ G06F 21/552 |
| 2005/0114369 A1 | 5/2005 | Gould et al. |
| 2005/0193097 A1 | 9/2005 | Guthrie |
| 2005/0246717 A1 | 11/2005 | Poole et al. |
| 2005/0257195 A1 | 11/2005 | Morrow et al. |
| 2005/0257198 A1 | 11/2005 | Stienhans |
| 2005/0283478 A1 | 12/2005 | Choi et al. |
| 2005/0289356 A1 | 12/2005 | Shoham |
| 2006/0036745 A1 | 2/2006 | Stienhans |
| 2006/0074735 A1 | 4/2006 | Shukla et al. |
| 2006/0095466 A1 | 5/2006 | Stevens et al. |
| 2006/0129690 A1 | 6/2006 | Hill et al. |
| 2006/0179150 A1 | 8/2006 | Farley |
| 2006/0294150 A1 | 12/2006 | Stanfill et al. |
| 2007/0011668 A1 | 1/2007 | Wholey |
| 2007/0073712 A1 | 3/2007 | Falk et al. |
| 2007/0079286 A1 | 4/2007 | Cook |
| 2007/0150429 A1 | 6/2007 | Huelsman et al. |
| 2007/0192863 A1 | 8/2007 | Kapoor et al. |
| 2007/0233655 A1 | 10/2007 | Engels |
| 2007/0239628 A1* | 10/2007 | Peck ................ G06F 9/453 |
| | | 706/11 |
| 2007/0256053 A1 | 11/2007 | Torgerson et al. |
| 2007/0271381 A1 | 11/2007 | Wholey et al. |
| 2007/0276689 A1 | 11/2007 | Slone |
| 2007/0294213 A1 | 12/2007 | Hacigumus et al. |
| 2008/0049022 A1 | 2/2008 | Sherb et al. |
| 2008/0082959 A1* | 4/2008 | Fowler ............ G06F 9/44505 |
| | | 717/104 |
| 2008/0091491 A1 | 4/2008 | Thorpe et al. |
| 2008/0256014 A1 | 10/2008 | Gould et al. |
| 2008/0263386 A1 | 10/2008 | Darrington et al. |
| 2008/0270920 A1 | 10/2008 | Hudson |
| 2009/0006454 A1 | 1/2009 | Zarzar et al. |
| 2009/0083313 A1 | 3/2009 | Stanfill et al. |
| 2009/0183094 A1 | 7/2009 | Ramamoorthy et al. |
| 2009/0216728 A1 | 8/2009 | Brainerd et al. |
| 2009/0319494 A1 | 12/2009 | Gooder |
| 2009/0327196 A1 | 12/2009 | Studer et al. |
| 2010/0217783 A1 | 8/2010 | Farver et al. |
| 2010/0235495 A1 | 9/2010 | Petersen et al. |
| 2010/0257198 A1* | 10/2010 | Cohen ............ G06F 16/24564 |
| | | 707/770 |
| 2010/0262902 A1 | 10/2010 | Burns |
| 2011/0145748 A1 | 6/2011 | Farver et al. |
| 2011/0153667 A1 | 6/2011 | Parmenter et al. |
| 2012/0011084 A1* | 1/2012 | Gulwani ............ G06F 40/16 |
| | | 706/12 |
| 2012/0096185 A1* | 4/2012 | Naparstek ......... H04L 41/145 |
| | | 709/246 |
| 2014/0229846 A1 | 8/2014 | Abaya et al. |
| 2014/0237352 A1* | 8/2014 | Sriganesh ......... G06F 40/143 |
| | | 715/234 |
| 2014/0250146 A1 | 9/2014 | Sato et al. |
| 2015/0301861 A1 | 10/2015 | LaChiusa et al. |
| 2016/0132360 A1 | 5/2016 | Raghavan et al. |

FOREIGN PATENT DOCUMENTS

| | | |
|---|---|---|
| CN | 101322096 | 12/2008 |
| CN | 101484874 | 7/2009 |
| EP | 2287808 | 2/2011 |
| JP | H06-230953 | 8/1994 |
| JP | H07-152544 | 6/1995 |
| JP | H10-222355 | 8/1998 |
| JP | 2004/516529 | 6/2004 |
| JP | 2004349355 | 12/2004 |
| JP | 2007011809 | 1/2007 |
| JP | 2007272809 | 10/2007 |
| JP | 2007280189 | 10/2007 |
| JP | 2009282777 | 12/2009 |
| JP | 2004172695 | 6/2014 |
| WO | 2001/95089 | 12/2001 |
| WO | 2002/11344 | 2/2002 |
| WO | 2005/043388 | 5/2005 |
| WO | 2006/091624 | 8/2006 |
| WO | 2007/076509 | 7/2007 |

OTHER PUBLICATIONS

Danikauskas, Tomas, et al., "Graphical User Interface Development on the Basis of Data Flows Specification." Computer and Information Sciences—ISCIS 2005 Lecture Notes in Computer Science, Jan. 1, 2005, pp. 904-914.

International Search Report & Written Option issued in PCT application PCT/US2010/058875, dated Apr. 13, 2011, 13 pages.

Japanese Office Action, with English translation, application No. 2012-543166, dated Oct. 30, 2015, 12 pages.

Japanese Office Action, with English Translation, application No. 2012-543166, dated Oct. 30, 2014, 5 pages.

International Search Report and Written Opinion issued in PCT/US2018/057361, dated Jan. 30, 2019.

International Preliminary Report on Patentability in PCT Appln. No. PCT/US2018/057361, dated Apr. 28, 2020, 8 pages.

(56) References Cited

OTHER PUBLICATIONS

Office Action in Indian Appln. No. 202047018932, dated Mar. 24, 2022, 8 pages.

* cited by examiner

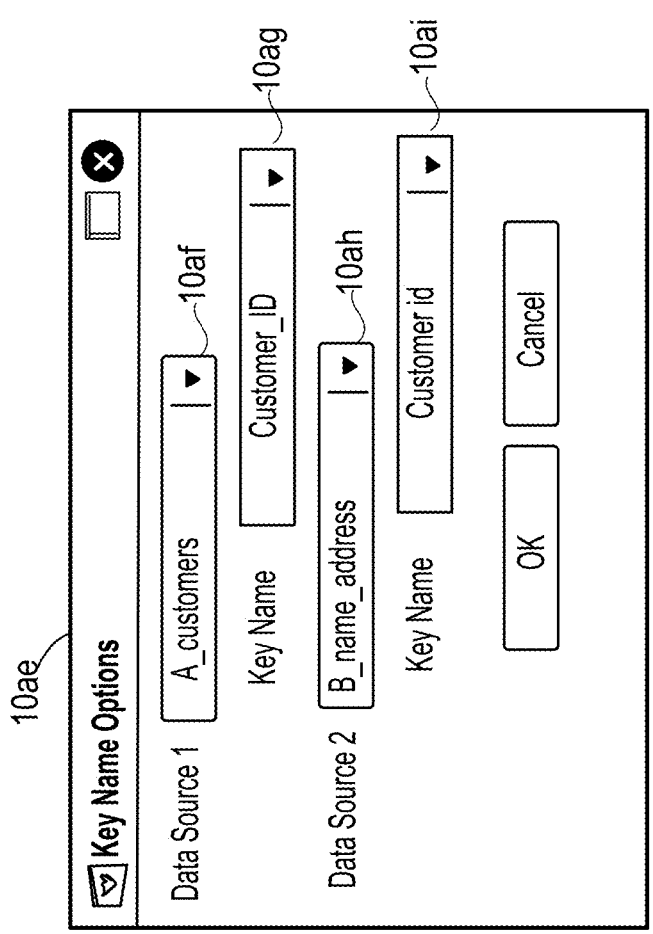
FIG. 2A (con't)

TRANSFORMING A SPECIFICATION INTO A PERSISTENT COMPUTER PROGRAM

TECHNICAL FIELD

The present application relates methods performed by a computer system, computer systems and computer-readable media for transforming a specification into a computer program that processes one or more values of one or more fields in a structured data item.

BACKGROUND

Complex data processing systems typically process data in multiple stages, with the results produced by one stage being fed into the next stage. The overall flow of information through such systems may be described in terms of a directed dataflow graph, with nodes or vertices in the graph representing components (either data files or processes), and the links or "edges" in the graph indicating flows of data between the components. A system for executing such graph-based computations is described in prior U.S. Pat. No. 5,966,072, titled "EXECUTING COMPUTATIONS EXPRESSED AS GRAPHS," incorporated herein by reference.

Graphs also can be used to invoke computations directly. Graphs made in accordance with this system provide methods for getting information into and out of individual processes represented by graph components, for moving information between the processes, and for defining a running order for the processes. Systems that invoke these graphs include algorithms that choose interprocess communication methods and algorithms that schedule process execution, and also provide for monitoring of the execution of the graph.

SUMMARY

In a general aspect 1, described is a method performed by a computer system in transforming a specification into a computer program that processes one or more values of one or more fields in a structured data item, including: accessing a specification that specifies a plurality of modules to be implemented by the computer program for processing the one or more values of the one or more fields in the structured data item; transforming the specification into the computer program that implements the plurality of modules, wherein the transforming includes: for each of one or more first modules of the plurality of modules: identifying one or more second modules of the plurality of modules that each receive input that is at least partly based on an output of the first module; and formatting an output data format of the first module such that the first module outputs only one or more values of one or more fields of the structured data item that are each (i) accessible to the first module, and (ii) specified as input into at least one of the one or more second modules at least partly based on the output of the first module; and saving, in persistent memory, the computer program, with the saved computer program specifying the formatted output data format for each of the one or more first modules. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In an aspect 2 according to aspect 1, contents of one or more portions of the computer program are distinct from the specification and are generated automatically without user input.

In an aspect 3 according to any one of aspects 1 to 2, the computer program is persistent and editable.

In an aspect 4 according to any one of aspects 1 to 3, the computer program is a dataflow graph, wherein each of the modules is a dataflow graph component represented by a node of the dataflow graph, and wherein dataflow graph components are coupled by data flows represented by links between nodes.

In an aspect 5 according to any one of aspects 1 to 4, the method further including: accessing, in data storage system, a data structure that maps data representing portions of the specification to the dataflow graph components; identifying, in the data structure, an item of data representing a particular portion of the specification; identifying, in the data structure, which dataflow graph component is mapped to the particular portion of the specification; and adding the identified dataflow graph component to the dataflow graph in accordance with an order of execution of operations specified by the specification.

In an aspect 6 according to any one of aspects 1 to 5, the method further includes identifying dependencies among the dataflow graph components; and at least partly based on these identified dependencies, specifying output data formats of the dataflow graph components.

In an aspect 7 according to any one of aspects 1 to 6, the method further includes: for a particular first module, determining that only one of one or more second modules accesses a particular one of one or more fields that are accessible to the particular first module; determining that the only one of the one or more second modules accesses the particular one of the one or more fields from a third module of the plurality of modules that is distinct from each of the particular first module and the one or more second modules; and formatting the output data format to not output one or more values for the particular one of the one or more fields accessed by the only one of the one or more second modules.

In an aspect 8 according to any one of aspects 1 to 7, the method further includes: providing data for display of a user interface; receiving, via the user interface, data representing a selection, from among a plurality of modules, of one or more modules for inclusion in the computer program; and receiving, via the user interface and for each selected module, a value of a parameter of an operation implemented by that selected one or more modules.

In an aspect 9 according to any one of aspects 1 to 8, the method further includes: determining whether the value received via the user interface complies with a predetermined criterion associated with the operation; and outputting a notification via the user interface indicating whether the received value complies with the predetermined criterion, wherein in case the received value is determined not to comply with the predetermined criterion, the notification including guiding information how the received value has to be changed to comply with the predetermined criterion.

In an aspect 10 according to any one of aspects 1 to 9, the method further includes: configuring a selected module with the value of the parameter; and storing the configured module for subsequent inclusion in and implementation by another computer program.

In an aspect 11 according to any one of aspects 1 to 10, the method further includes: executing, before executing the computer program, first, second and third passes for each particular module of the plurality of modules to determine and save the formatted output data format for the particular module specifying which fields are required by modules downstream to the particular module and to determine and save an input data format for the particular module specifying which fields are accessible to the particular module, the executing including: during the first pass, the particular module broadcasts, to modules upstream to the particular module, one or more messages that include data representing those one or more fields that are required by itself and by any modules downstream of the particular module, wherein the particular module that performs the broadcast is a broadcasting module and wherein the upstream modules that receive the broadcast are recipient modules; during the second pass, the recipient modules transmit to the broadcasting module one or more messages specifying which recipient modules can provide values of the required fields; and during the third pass, the broadcasting module analyzes the messages received from the recipient modules and, in response, the broadcasting module transmits back to the recipient modules one or more messages specifying which recipient module is responsible for transmitting which field to the broadcasting module.

In an aspect 12 according to any one of aspects 1 to 11, the method further includes: receiving, in a data stream, the structured data item including one or more data records; and for at least one of the one or more data records, executing the computer program to process the at least one of the one or more data records; and based a saved output data format of at least one of the one or more first modules, removing, prior to submission of the at least one of the one or more records to one of the one or more second modules, one or more fields from the at least one of the records that are not specified as input into at least one of the one or more second modules at least partly based on the output of the first module.

In an aspect 13 according to any one of aspects 1 to 12, the method further includes: defining, in the specification, one or more new modules; and saving at least one of the one or more new modules to a global palette that specifies entities that are available for inclusion in other specifications.

In an aspect 14 according to any one of aspects 1 to 13, the method further includes: defining, in the specification, one or more new modules; and saving at least one of the one or more new modules to a local palette that specifies entities that are available for inclusion only in the specification and not in other specifications.

In an aspect 15 according to any one of aspects 1 to 14, the method further includes: accessing a previously defined module that is included in a global palette for specification definition; modifying one or more attributes of the previously defined module; and performing an operation including: storing the modified previously defined module to a local palette that specifies entities that are available for inclusion only in the specification and not in other specifications; or saving the modified previously defined module to the global palette such that the modified previously defined module is accessible to other specifications.

In an aspect 16 according to any one of aspects 1 to 15, the method further includes: defining, in the specification, one or more new first modules; defining, in the specification, one or more new second modules; and configuring at least one of the one or more new first modules to be a data source for at least one of the one or more new second modules.

In an aspect 17 according to any one of aspects 1 to 16, a module includes one or more other modules.

In an aspect 18 according to any one of aspects 1 to 17, the method further includes: configuring a selected module with a value of a parameter; and storing the configured module for subsequent inclusion in another program.

In an aspect 19 according to any one of aspects 1 to 18, the method further includes: determining that only one of the one or more second modules accesses a particular one of the one or more fields that are accessible to the first module; determining that the only one of the one or more second modules accesses the particular one of the one or more fields from a third module that is distinct from the first module; and formatting the output data format to not output one or more values for the particular one of the one or more fields accessed by the only one of the one or more second modules.

In an aspect 20 according to any one of aspects 1 to 19, a structured data item includes a data record.

In a general aspect 21, a method performed by a computer system in transforming a specification into a computer program that processes one or more values of one or more fields in a structured data item, includes: transforming a specification that specifies a plurality of modules into a computer program to implement the modules for processing of the one or more values of the one or more fields in the structured data item, wherein the transforming includes: for each of one or more first modules of the plurality of modules: identifying one or more second modules of the plurality of modules that each receive input that is at least partly based on an output of the first module; determining one or more of the fields for which one or more values are processed by the one or more second modules by: for each of the one or more second modules, determining one or more of the fields for which one or more values are processed by that second module, when that second module is configured to process one or more values of one or more fields; determining, from among the one or more fields for which the one or more values are processed by the one or more second modules, one or more of the fields for which one or more values are accessible to the first module; for each of the one or more fields for which the one or more values are accessible to the first module, determining whether a value of the field is specified as input into at least one of the one or more second modules at least partly based on the output of the first module; and formatting an output data format of the first module such that the first module outputs only one or more values of one or more fields that are each specified as input into at least one of the one or more second modules at least partly based on the output of the first module; and saving, in persistent memory, the computer program, with the computer program specifying an output data format for each of the one or more first modules. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In a general aspect 22, a computer system for transforming a specification into a computer program that processes one or more values of one or more fields in a structured data item, the computer system includes: one or more processing devices; and one or more machine-readable hardware storage devices storing instructions that are executable by the one or more processing devices to perform operations including: accessing a specification that specifies a plurality of modules to be implemented by the computer program for processing the one or more values of the one or more fields in the structured data item; transforming the specification into the computer program that implements the plurality of modules, wherein the transforming includes: for each of one or more first modules of the plurality of modules: identifying one or more second modules of the plurality of modules that each receive input that is at least partly based on an output of the first module; and formatting an output data format of the first module such that the first module outputs only one or more values of one or more fields of the structured data item that are each (i) accessible to the first module, and (ii) specified as input into at least one of the one or more second modules at least partly based on the output of the first module; and saving, in persistent memory, the computer program, with the saved computer program specifying the formatted output data format for each of the one or more first modules.

In an aspect 23 according to aspect 22, contents of one or more portions of the computer program are distinct from the specification and are generated automatically without user input.

In an aspect 24 according to any one of aspects 22 to 23, the computer program is persistent and editable.

In an aspect 25 according to any one of aspects 22 to 24, the computer program is a dataflow graph, wherein each of the modules is a dataflow graph component represented by a node of the dataflow graph, and wherein dataflow graph components are coupled by data flows represented by links between nodes.

In an aspect 26 according to any one of aspects 22 to 25, the operations further include: accessing, in data storage system, a data structure that maps data representing portions of the specification to the dataflow graph components; identifying, in the data structure, an item of data representing a particular portion of the specification; identifying, in the data structure, which dataflow graph component is mapped to the particular portion of the specification; and adding the identified dataflow graph component to the dataflow graph in accordance with an order of execution of operations specified by the specification.

In an aspect 27 according to any one of aspects 22 to 26, the operations further include identifying dependencies among the dataflow graph components; and at least partly based on these identified dependencies, specifying output data formats of the dataflow graph components.

In an aspect 28 according to any one of aspects 22 to 27, the operations further include: for a particular first module, determining that only one of one or more second modules accesses a particular one of one or more fields that are accessible to the particular first module; determining that the only one of the one or more second modules accesses the particular one of the one or more fields from a third module of the plurality of modules that is distinct from each of the particular first module and the one or more second modules; and formatting the output data format to not output one or more values for the particular one of the one or more fields accessed by the only one of the one or more second modules.

In an aspect 29 according to any one of aspects 22 to 28, the operations further include: providing data for display of a user interface; receiving, via the user interface, data representing a selection, from among a plurality of modules, of one or more modules for inclusion in the computer program; and receiving, via the user interface and for each selected module, a value of a parameter of an operation implemented by that selected one or more modules.

In an aspect 30 according to any one of aspects 22 to 29, the operations further include: determining whether the value received via the user interface complies with a predetermined criterion associated with the operation; and outputting a notification via the user interface indicating whether the received value complies with the predetermined criterion, wherein in case the received value is determined not to comply with the predetermined criterion, the notification including guiding information how the received value has to be changed to comply with the predetermined criterion.

In an aspect 31 according to any one of aspects 22 to 30, the operations further include: configuring a selected module with the value of the parameter; and storing the configured module for subsequent inclusion in and implementation by another computer program.

In an aspect 32 according to any one of aspects 22 to 31, the operations further include: executing, before executing the computer program, first, second and third passes for each particular module of the plurality of modules to determine and save the formatted output data format for the particular module specifying which fields are required by modules downstream to the particular module and to determine and save an input data format for the particular module specifying which fields are accessible to the particular module, the executing including: during the first pass, the particular module broadcasts, to modules upstream to the particular module, one or more messages that include data representing those one or more fields that are required by itself and by any modules downstream of the particular module, wherein the particular module that performs the broadcast is a broadcasting module and wherein the upstream modules that receive the broadcast are recipient modules; during the second pass, the recipient modules transmit to the broadcasting module one or more messages specifying which recipient modules can provide values of the required fields; and during the third pass, the broadcasting module analyzes the messages received from the recipient modules and, in response, the broadcasting module transmits back to the recipient modules one or more messages specifying which recipient module is responsible for transmitting which field to the broadcasting module.

In an aspect 33 according to any one of aspects 22 to 32, the operations further include: receiving, in a data stream, the structured data item including one or more data records; and for at least one of the one or more data records, executing the computer program to process the at least one of the one or more data records; and based a saved output data format of at least one of the one or more first modules, removing, prior to submission of the at least one of the one or more records to one of the one or more second modules, one or more fields from the at least one of the records that are not specified as input into at least one of the one or more second modules at least partly based on the output of the first module.

In an aspect 34 according to any one of aspects 22 to 33, the operations further include: defining, in the specification, one or more new modules; and saving at least one of the one or more new modules to a global palette that specifies entities that are available for inclusion in other specifications.

In an aspect 35 according to any one of aspects 22 to 34, the operations further include: defining, in the specification, one or more new modules; and saving at least one of the one or more new modules to a local palette that specifies entities that are available for inclusion only in the specification and not in other specifications.

In an aspect 36 according to any one of aspects 22 to 35, the operations further include: accessing a previously defined module that is included in a global palette for specification definition; modifying one or more attributes of the previously defined module; and performing an operation including: storing the modified previously defined module to a local palette that specifies entities that are available for inclusion only in the specification and not in other specifications; or saving the modified previously defined module to the global palette such that the modified previously defined module is accessible to other specifications.

In an aspect 37 according to any one of aspects 22 to 36, the operations further include: defining, in the specification, one or more new first modules; defining, in the specification, one or more new second modules; and configuring at least one of the one or more new first modules to be a data source for at least one of the one or more new second modules.

In an aspect 38 according to any one of aspects 22 to 37, a module includes one or more other modules.

In an aspect 39 according to any one of aspects 22 to 38, the operations further include: configuring a selected module with a value of a parameter; and storing the configured module for subsequent inclusion in another program.

In an aspect 40 according to any one of aspects 22 to 39, the operations further include: determining that only one of the one or more second modules accesses a particular one of the one or more fields that are accessible to the first module; determining that the only one of the one or more second modules accesses the particular one of the one or more fields from a third module that is distinct from the first module; and formatting the output data format to not output one or more values for the particular one of the one or more fields accessed by the only one of the one or more second modules.

In an aspect 41 according to any one of aspects 22 to 40, a structured data item includes a data record.

In a general aspect 42, one or more machine-readable hardware storage devices for transforming a specification into a computer program that processes one or more values of one or more fields in a structured data item, the one or more machine-readable hardware storage devices storing instructions that are executable by one or more processing devices to perform operations including: accessing a specification that specifies a plurality of modules to be implemented by the computer program for processing the one or more values of the one or more fields in the structured data item; transforming the specification into the computer program that implements the plurality of modules, wherein the transforming includes: for each of one or more first modules of the plurality of modules: identifying one or more second modules of the plurality of modules that each receive input that is at least partly based on an output of the first module; and formatting an output data format of the first module such that the first module outputs only one or more values of one or more fields of the structured data item that are each (i) accessible to the first module, and (ii) specified as input into at least one of the one or more second modules at least partly based on the output of the first module; and saving, in persistent memory, the computer program, with the saved computer program specifying the formatted output data format for each of the one or more first modules.

In an aspect 43 according to aspect 42, contents of one or more portions of the computer program are distinct from the specification and are generated automatically without user input.

In an aspect 44 according to any one of aspects 42 to 43, the computer program is persistent and editable.

In an aspect 45 according to any one of aspects 42 to 44, the computer program is a dataflow graph, wherein each of the modules is a dataflow graph component represented by a node of the dataflow graph, and wherein dataflow graph components are coupled by data flows represented by links between nodes.

In an aspect 46 according to any one of aspects 42 to 45, the operations further include: accessing, in data storage system, a data structure that maps data representing portions of the specification to the dataflow graph components; identifying, in the data structure, an item of data representing a particular portion of the specification;

identifying, in the data structure, which dataflow graph component is mapped to the particular portion of the specification; and adding the identified dataflow graph component to the dataflow graph in accordance with an order of execution of operations specified by the specification.

In an aspect 47 according to any one of aspects 42 to 46, the operations further include identifying dependencies among the dataflow graph components; and at least partly based on these identified dependencies, specifying output data formats of the dataflow graph components.

In an aspect 48 according to any one of aspects 42 to 47, the operations further include: for a particular first module, determining that only one of one or more second modules accesses a particular one of one or more fields that are accessible to the particular first module; determining that the only one of the one or more second modules accesses the particular one of the one or more fields from a third module of the plurality of modules that is distinct from each of the particular first module and the one or more second modules; and formatting the output data format to not output one or more values for the particular one of the one or more fields accessed by the only one of the one or more second modules.

In an aspect 49 according to any one of aspects 42 to 48, the operations further include: providing data for display of a user interface; receiving, via the user interface, data representing a selection, from among a plurality of modules, of one or more modules for inclusion in the computer program; and receiving, via the user interface and for each selected module, a value of a parameter of an operation implemented by that selected one or more modules.

In an aspect 50 according to any one of aspects 42 to 49, the operations further include: determining whether the value received via the user interface complies with a predetermined criterion associated with the operation; and outputting a notification via the user interface indicating whether the received value complies with the predetermined criterion, wherein in case the received value is determined not to comply with the predetermined criterion, the notification including guiding information how the received value has to be changed to comply with the predetermined criterion.

In an aspect 51 according to any one of aspects 42 to 50, the operations further include: configuring a selected module with the value of the parameter; and storing the configured module for subsequent inclusion in and implementation by another computer program.

In an aspect 52 according to any one of aspects 42 to 51, the operations further include: executing, before executing the computer program, first, second and third passes for each particular module of the plurality of modules to determine and save the formatted output data format for the particular module specifying which fields are required by modules downstream to the particular module and to determine and save an input data format for the particular module specifying which fields are accessible to the particular module, the executing including: during the first pass, the particular module broadcasts, to modules upstream to the particular module, one or more messages that include data representing those one or more fields that are required by itself and by any modules downstream of the particular module, wherein the particular module that performs the broadcast is a broadcasting module and wherein the upstream modules that receive the broadcast are recipient modules; during the second pass, the recipient modules transmit to the broadcasting module one or more messages specifying which recipient modules can provide values of the required fields; and during the third pass, the broadcasting module analyzes the messages received from the recipient modules and, in response, the broadcasting module transmits back to the recipient modules one or more messages specifying which recipient module is responsible for transmitting which field to the broadcasting module.

In an aspect 53 according to any one of aspects 42 to 52, the operations further include: receiving, in a data stream, the structured data item including one or more data records; and for at least one of the one or more data records, executing the computer program to process the at least one of the one or more data records; and based a saved output data format of at least one of the one or more first modules, removing, prior to submission of the at least one of the one or more records to one of the one or more second modules, one or more fields from the at least one of the records that are not specified as input into at least one of the one or more second modules at least partly based on the output of the first module.

In an aspect 54 according to any one of aspects 42 to 53, the operations further include: defining, in the specification, one or more new modules; and saving at least one of the one or more new modules to a global palette that specifies entities that are available for inclusion in other specifications.

In an aspect 55 according to any one of aspects 42 to 54, the operations further include: defining, in the specification, one or more new modules; and saving at least one of the one or more new modules to a local palette that specifies entities that are available for inclusion only in the specification and not in other specifications.

In an aspect 56 according to any one of aspects 42 to 55, the operations further include: accessing a previously defined module that is included in a global palette for specification definition; modifying one or more attributes of the previously defined module; and performing an operation including: storing the modified previously defined module to a local palette that specifies entities that are available for inclusion only in the specification and not in other specifications; or saving the modified previously defined module to the global palette such that the modified previously defined module is accessible to other specifications.

In an aspect 57 according to any one of aspects 42 to 56, the operations further include: defining, in the specification, one or more new first modules; defining, in the specification, one or more new second modules; and configuring at least one of the one or more new first modules to be a data source for at least one of the one or more new second modules.

In an aspect 58 according to any one of aspects 42 to 57, a module includes one or more other modules.

In an aspect 59 according to any one of aspects 42 to 58, the operations further include: configuring a selected module with a value of a parameter; and storing the configured module for subsequent inclusion in another program.

In an aspect 60 according to any one of aspects 42 to 59, the operations further include: determining that only one of the one or more second modules accesses a particular one of the one or more fields that are accessible to the first module; determining that the only one of the one or more second modules accesses the particular one of the one or more fields from a third module that is distinct from the first module; and formatting the output data format to not output one or more values for the particular one of the one or more fields accessed by the only one of the one or more second modules.

In an aspect 61 according to any one of aspects 42 to 60, a structured data item includes a data record.

There are numerous advantages to formatting an output data format of the first module such that the first module outputs only one or more values of one or more fields of the structured data item that are each (i) accessible to the first module, and (ii) specified as input into at least one of the one or more second modules at least partly based on the output of the first module. These advantages includes reduced consumption of computational resources (such as memory and CPU), because only those data fields are forwarded and processed deeper within the computer program that are needed to fulfill the data processing requirements of downstream data processing in the computer program. Furthermore, decreased latency in data record processing is achieved, because the data processing system is able to process smaller records (e.g., which result from dropping of fields) more quickly, relative to a speed of data processing when the data processing system has to process an entire data record through a dataflow graph. Other advantages include decreased memory and resource consumption, as a smaller record (e.g., due to the dropping of fields) consumes less memory space during the processing of the record.

Other features and advantages will become apparent from the following description, and from the claims.

DESCRIPTION

Each of the examples and optional features described below may be combined with any of the appended claims. Also, each of the examples and optional features described below may be combined with any one of the other examples and optional features described below and the combination may be combined with any of the appended claims.

Figure 1A:
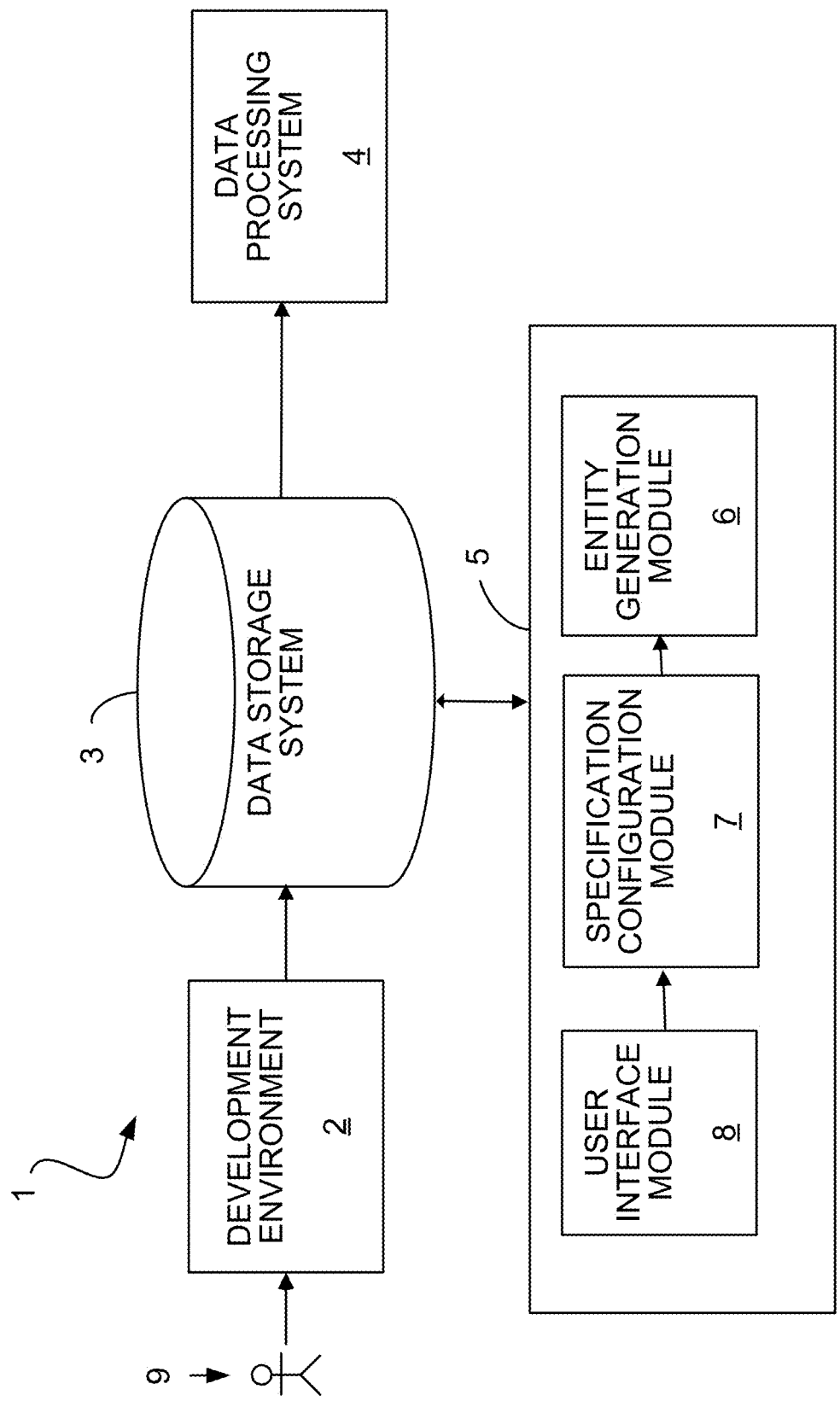
FIG. 1A is a schematic diagram of a database management system.

Referring to FIG. 1A, a system 1 for transforming a specification into a computer program, such as a dataflow graph, includes a transformation environment 5 that includes a specification configuration module 7, and optionally an entity generation module band a user interface module 8, as well as a data storage system 3 and a data processing system 4. Generally, an "entity" includes a portion of a computer program (e.g., a pre-defined portion of a computer program for inclusion in another computer program) or one or more dataflow graph components (e.g., that are encapsulated together into a pre-defined module). Throughout this document, an "entity" may also be referred to as a "module", without limitation and for purposes of convenience. Dataflow graph components may include data processing components and/or datasets such as a data sink and/or a data source. The dataflow graph can be represented by a directed graph that includes nodes or vertices, representing the dataflow graph components, connected by directed links or data flow connections, representing flows of work elements (i.e., data) between the dataflow graph components. The data processing component may include code for processing data from at least one data input and providing data to at least one data output of the data processing component. The dataflow graph can thus implement a graph-based computation performed on data flowing from one or more input data sets through the graph components to one or more output data sets.

Generally, the specification configuration module 7 includes a module for configuring a specification. There are various types of specifications, including, e.g., a specification for an entity, a specification for a dataflow graph, and so forth. Generally, a specification for an entity may identify dataflow graph components and may identify particular components for which certain functions can be performed while the user is configuring the graph, such as viewing sample data. A specification for a dataflow graph may define which entities (i.e., dataflow graph components) are to be included in a dataflow graph, values of parameters for those included entities and a flow of data among included entities.

System 1 also includes the data processing system 4 for executing one or more computer programs (such as dataflow graphs), which were generated by a transformation of the specification into the computer programs using the transformation environment 5 and using the techniques described herein. The data processing system 4 may be hosted on one or more general-purpose computers under the control of a suitable operating system, such as the UNIX operating system. For example, the data processing system 4 can include a multiple-node parallel computing environment including a configuration of computer systems using multiple central processing units (CPUs), either local (e.g., multiprocessor systems such as SMP computers), or locally distributed (e.g., multiple processors coupled as clusters or MPPs), or remotely distributed (e.g., multiple processors coupled via LAN or WAN networks), or any combination thereof.

The entity generation module 6 (e.g., which may be optional in some examples) generates entities, as described in more detail below. The user interface module 8 (e.g., which may be optional in some examples) displays configuration information to a user and receives data representing configuration actions from the user. In particular, the user interface module 8 displays a visual representation that enables a user to select which entities to be included in the computer program or the dataflow graph and to input value of parameters for those entities. The term "parameter" used herein may influence the outcome of an operation executed or implemented by the entity and may thus also be called an "operational parameter." The user interface module 8 also enables a user to generate an entity, e.g., by inputting parameter values that specify which components are to be included in the entity and the configuration of components relative to each other. The user interface module 8 also communicates with the specification configuration module 7, which configures a specification based on the actions (such as the mentioned user-initiated selections or input) of the user at the user interface. In this example, the specification configuration module 7 configures a specification based on the entities selected (or an entity definition, when a user is defining a new entity) or otherwise specified in the user interface. Based on contents of the specification, the entity generation module 6 generates an entity for inclusion in or implementation by a dataflow graph and for execution. In general, the entities, dataflow graphs and/or specifications can be stored in the data storage system 3, which is accessible to the transformation environment 5.

The transformation environment 5 is in communication with the data storage system 3, which includes data used by the user interface module 8 to display a user interface. The data storage system 3 is also accessible to an optional development environment 2, in which a developer 9 is able to develop user interfaces, stored in the data storage system 3, that can be used by the user interface module 8 to display a user interface, such as user interfaces 10, 11, 15 or 38 described below. The transformation environment 5 is, in some implementations, a system for developing applications as dataflow graphs that include entities.

Figure 1B:
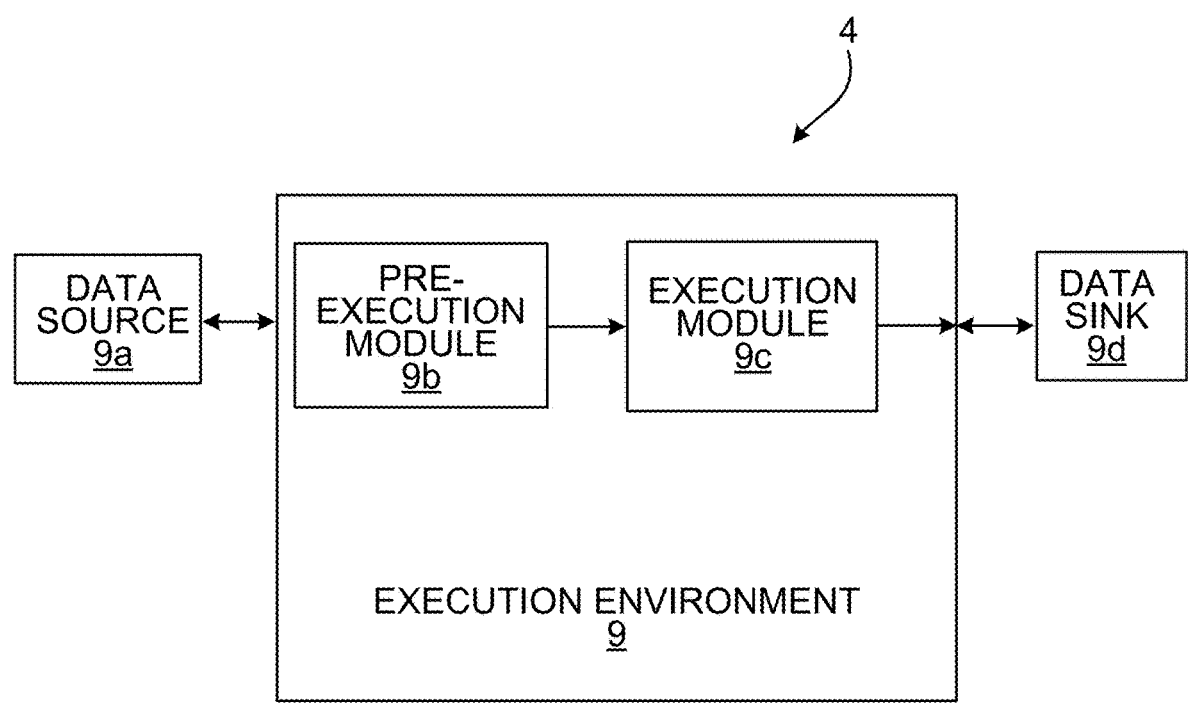
FIG. 1B is a schematic diagram of a data processing system.

As illustrated in FIG. 1B, the data processing system 4 may include one or more data sources 9a that include one or more sources of data as well as an execution environment 9 coupled to the data storage system 3 (FIG. 1A) and being hosted on one or more computers, the execution environment 9 may include a pre-execution module 9b configured to allocate and configure computing resources (such as CPU and/or primary memory) for performing the computation (such as data processing operations) of the computer program, e.g., data processing operations performed by the dataflow graph components. The execution environment 9 may also include an execution module 9c to schedule and control execution of the computation of the computer program. The computer program may be specified by programming code and/or data structures stored in the data storage system 3, which may be read by the pre-execution module 9b or the execution module 9c during execution of the computer program.

The entity is a portion of a computer program executed within the execution environment that processes data from the one or more data sources 9a. The data from the data sources are manipulated and processed according to the entities included in the computer program or dataflow graph and exported to one or more data sinks 9d. In other words, the execution module 9c is configured to process data from the data sources 9a according to the computer program, such as the dataflow graph, using computational resources of the execution environment 9 allocated by the pre-execution module 9b to the computer program to generate output data that may be exported to the one or more data sinks 9d. Data sources and sinks 9a, 9d, respectively, can include files, databases, data streams, or queues, for example.

As already mentioned, the data processing components may each include code for processing data from at least one data input and providing data to at least one data output. The entities are included in dataflow graphs that also include nodes representing dataset objects for accessing the data sources and/or sinks. The nodes are connected by directed links representing flows of data between the components, originating at the data sources and terminating at the data sinks. The data output ports of upstream dataflow graph components are connected to the data input ports of downstream dataflow graph components. The dataflow graphs and/or entities may be reused for different data sources and different data sinks represented by the dataset objects. The data structures and computer program code used to implement dataflow graphs and/or entities can support multiple different configurations by being parameterized via parameters to enable different sources and sinks to be substituted readily, for example. Furthermore, in some arrangements, the flow of the entity may be altered by the use of parameters, such that a component or a series of components may be bypassed. In general, a parameter represents a property of an entity that can be configured or changed and that has an influence on the operations performed by the entity. In general, a parameter or property of the entity can be changed between uses of the entity, and the entity may perform operations (e.g., e.g., processing of data) differently as a result of the changed property or parameter.

The construction entity can be highly technical in nature in some cases. The underlying structure and construction of the entity is determined based upon technical considerations. For example, graph components may be selected to maximize reusability, or to support parallel processing. Some of the parameters associated with an entity can be used to enable user, who are not experts in computing, to customize entities without requiring the user to understand the technical complexities behind its implementation. The parameterized entities simplify customization and facilitate reuse for a larger variety of applications, circumstances and user backgrounds.

A user interface for identification of entities and associated parameter values for constructing a dataflow graph and/or entity can be presented on a client machine or user device. In some implementations, the client may be accessing the development environment 2 (FIG. 1A) running on a server using a web browser on the client that provides the parameter interface, and using a scripting language which provides some capability for client side processing. The scripting language may communicate with the server to update parameters and perform other necessary operations. This communication may occur via a bridge machine which translates the communications between the client and the server running the development environment storing objects and associated parameter values for the graphs and entities being constructed.

The user interface allows a user to select entities to be included in a dataflow graph and to configure the parameters of an entity even if the user lacks technical knowledge relating to dataflow graphs and dataflow graph configuration. In particular, the dataflow graph is converted into executable logic for processing of data records. That is, the execution of the executable logic produces code (e.g., compiled code) for processing of records.

In a variation, system 1 also includes a data source that may include one or more sources of data such as storage devices or connections to online data streams, each of which may store data in any of a variety of storage formats (e.g., database tables, spreadsheet files, flat text files, or a native format used by a mainframe). This data source may be identical to the one or more data sources 9a or may be an additional data source. In any case, storage devices providing the data source may be local to the data processing system 4, for example, being stored on a storage medium connected to a computer running the data processing system 4 (e.g., a hard drive), or may be remote to the data processing system 4, for example, being hosted on a remote system (e.g., mainframe) in communication with a computer running the data processing system 4 over a local or wide area data network.

Figure 2A:
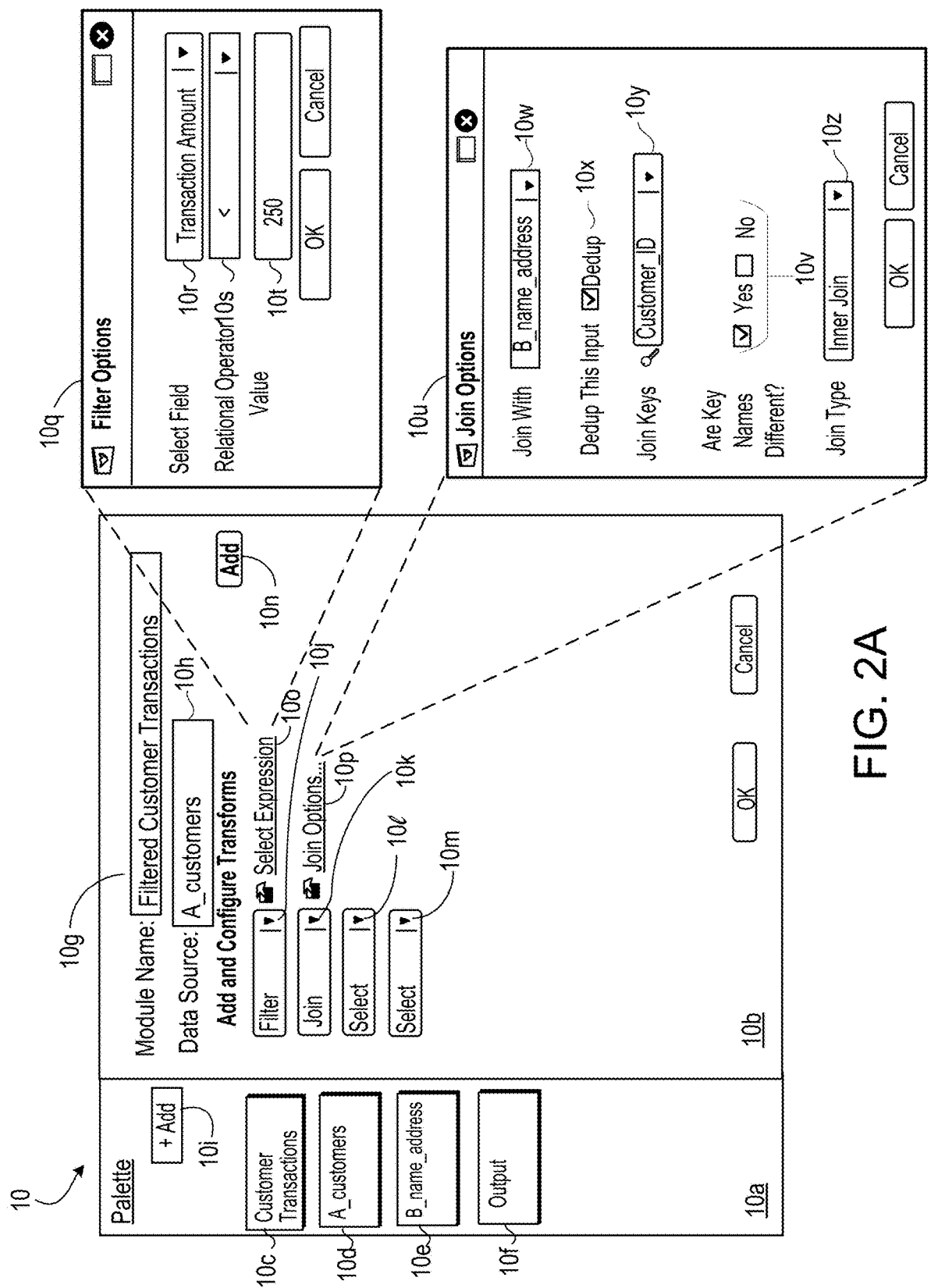
FIG. 2A is an example graphical user interface for defining a module.

Referring to FIG. 2A, diagram 10 illustrates a graphical user interface (hereinafter "graphical user interface 10") for configuring one or more modules or entities. In this example, graphical user interface 10 includes palette portion 10a for selecting one or more pre-configured modules (i.e., visual representations 10c-10f of modules). In general, palette portion 10a represents a plurality of modules (e.g., also referred to as a palette of modules) that are available for inclusion in a computer program or a dataflow graph. Palette portion 10a may also include add control 10i for creating a new module to be added to the plurality of modules. Graphical user interface 10 may also include configuration portion 10b for configuration of a new module.

In this example, upon selection of add control 10i for creating a new module to be added to the plurality of modules, configuration portion 10b prompts a user to configure the new module, e.g., by presenting input portion 10g for input of information specifying the module such as information specifying a module name. Configuration portion 10b may also include data source input box 10h for specifying a data source for the module specified by input portion 10g. In this example, a user may input into data source input box 10h a name of a data file or may drag and drop a data source module (e.g., represented by one of visual representations 10d, 10e) into data source input box 10h. In this example, a user has dragged and dropped visual representation 10d into data source input box 10h to specify that "A_customers" is the data source for the "Filtered Customer Transactions" module. Configuration portion 10b may also include controls 10j-10p for adding and configuring one or more parameters, transforms or operations for the module being created or defined in configuration portion 10b. In this example, each of controls 10j-10p enables a user to select a value for a parameter, an operation or a transform and to thereby configure that parameter, operation or transform. For example, control 10j specifies that the module being created includes a filter operation, e.g., the filter operation may format an output data format of the module, as described herein. In this example, a user selects a filter option from a drop down box included in control 10j. Control 10o is juxtaposed to control 10j. Selection of control 10o enables a user to configure the filter operation specified by control 10j. In this example, upon selection of control 10o, overlay 10q is displayed. Overlay 10q includes controls 10r, 10s and input portion 10t for specifying a condition or expression to be implemented (or evaluated) by the filter operation.

Control 10k specifies that the module being created includes a join operation. In this example, a user selects a join option from a drop down box included in control 10k. Control 10p is juxtaposed to control 10k. Selection of control 10p enables a user to configure the join operation specified by control 10k. In this example, upon selection of control 10p, overlay 10u is displayed. Overlay 10u includes controls 10v-10z specifying the actions or operations implemented as part of the join operation. In this example, records output from the A_customers module (e.g., formatted records indicative of customer transactions) are joined with records output from the B_name_address module (e.g., formatted records specifying customers' name and address) to create a dataset that includes customer names and addresses for various transactions. Control 10v enables a user to specify whether key names for the data source specified in data source input box 10h differ from the key names specified by the data source specified in control 10w. For example, a user may be joining two data sources that have different formats for a particular data field or key, e.g., a customer identifier key. In this example, the data source specified in control 10w is the B_name_address module specified by visual representation 10e. In this example, when a user specifies, via control 10v, that the key names are different, overlay 10ae is displayed. In this example, overlay 10ae enables a user to specify the various key names for the various data sources. In this example, control 10ag enables a user to specify the key name for the data source specified in control 10af. Additionally, control 10ai enables a user to specify the key name for the data source specified by control 10ah. Configuration portion 10b includes add control 10n, selection of which enables a user to add additional transforms. In this example, the customer transactions module (represented by visual representation 10c) is the same as the filtered customer transactions module, except for excluding the filtering operations.

Figure 2B:
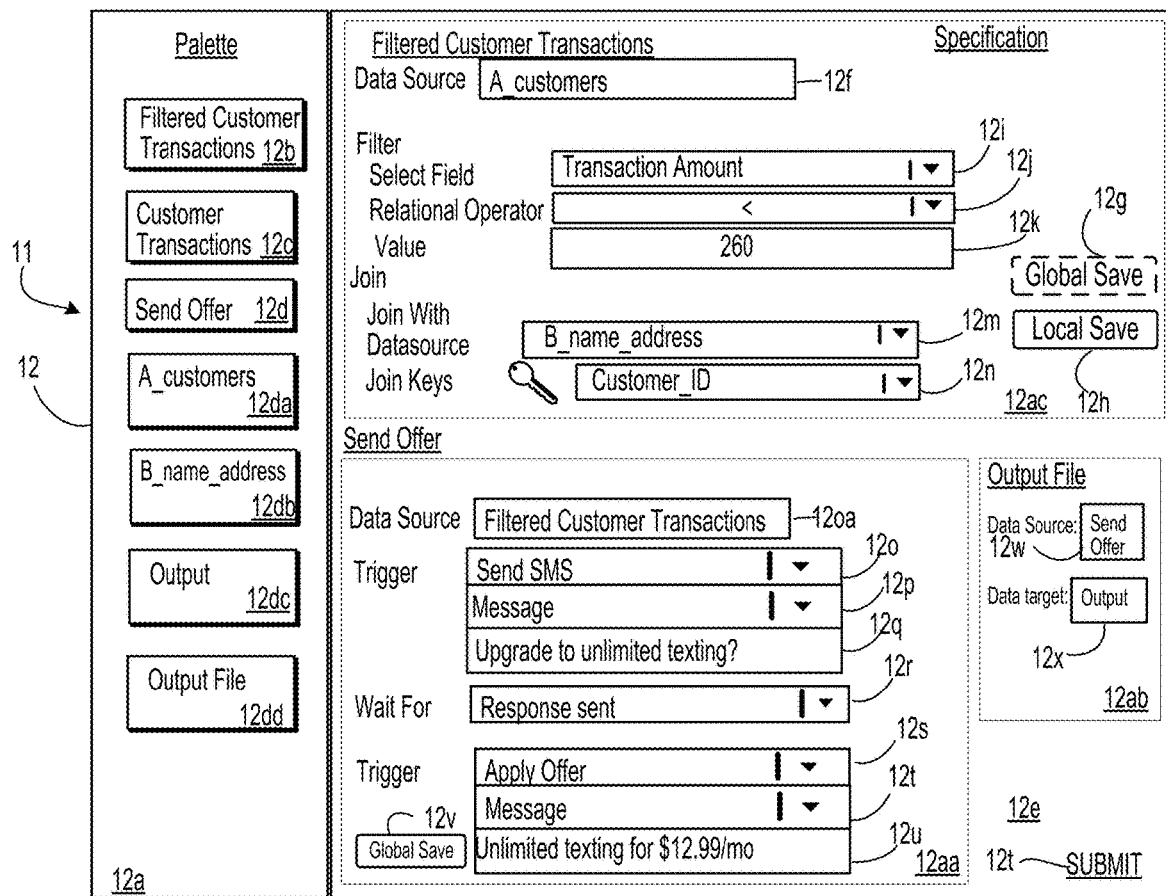
FIGS. 2B, 2C and 2D are each an example transformation of a specification to a persistent computer program.
Figure 2B:
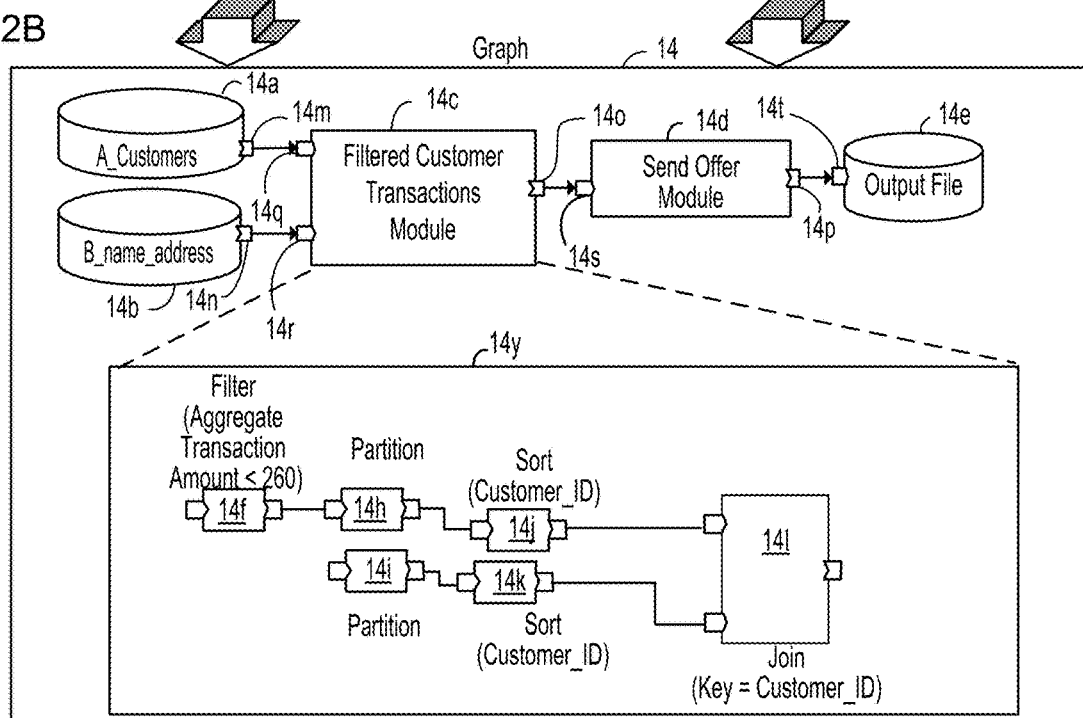

Referring to FIG. 2B, diagram 11 illustrates a "real-world" example of transformation of a specification into a program (e.g., a computer program), which in this example is a dataflow graph. In this example, diagram 11 shows graphical user interface 12, which may be disjoint or different from the graphical user interface 10 described above in context of FIG. 2A, 2B, and which includes palette portion 12a and configuration portion 12e. Palette portion 12a displays a plurality of modules available for defining a computer program. In this example, palette portion 12a displays visual representations 12b, 12c, 12d, 12da, 12db, 12dc, 12dd. In this example, visual representation 12b represents the filtered customer transactions module that was defined in FIG. 2A. Visual representation 12c represents a previously defined customer transactions module, e.g., the same customer transaction module that was represented by visual representation 10c in FIG. 2A. Visual representation 12d represents a send offer module, as described below. Visual representations 12da, 12db represent an A_customers module (e.g., that specifies a particular data source and how to format data records from that data source) and a B_name_address module (e.g., that specifies another particular data source and appropriate reformatting). In this example, visual representations 12da, 12db represent the same data sources as those represented by visual representations 10d, 10e. Visual representation 12dc represents an output module that specifies an output file to which data is stored. In this example, visual representation 12dc represents the same output module represented by visual representation 10f in FIG. 2A. Each of visual representations 12b, 12c, 12d, 12da, 12db, 12dc, 12dd is selectable and can be "dragged and dropped" into configuration portion 12e, for example, to add a module to a computer program. Configuration portion 12e provides a user interface for specifying parameters for modules selected from the palette displayed in palette portion 12a (e.g., visual representations 12b, 12c, 12d, 12da, 12db, 12dc, 12dd) representing modules to be included in a computer program or a dataflow graph. Configuration portion 12e includes portion 12ac (for modifying the previously defined filtered customer transaction module, represented by visual representation 12b) and portions 12aa, 12ab for defining new modules: a send offer module (represented by visual representation 12d) and an output file module (represented by visual representation 12dd).

Portion 12ac displays controls 12f, 12i, 12j, 12k, 12m, 12n for modifying one or more parameters or attributes of the filtered customer transaction module represented by visual representation 12b. In particular, each of controls 12f, 12i, 12j, 12k, 12m, 12n is prepopulated based on data specified in data source input box 10h (FIG. 2A) and selections or data input into controls 10r, 10s, input portion 10t, and controls 10v, 10w, 10y (FIG. 2A), respectively. The data in each of controls 12f, 12i, 12j, 12k, 12m, 12n is modifiable to enable user customization of the module.

In this example, following modification of one or more values of parameters or attributes that are adjustable by one or more controls 12f, 12i, 12j, 12k, 12m, 12n, the modifications can be saved as a global save via global save control 12g or as a local save via local save control 12h. In this example, a global save results in updating of a module across all palettes (currently used in defining graphs and that will be used in the future—not just palette 12a) in a global palette and across graphs and computer programs that access the module. Generally, a global palette is a definition or listing of the modules that are globally available in defining a graph. That is, these modules in the global palette are not constrained to simply the specification or graph being defined. A local save updates the module locally—only for the particular palette that is displayed and only for a particular graph that is being defined. That is, in a local save, the scope of the modification of the module is limited to only that palette and graph. In this example, a user has selected global save control (as specified by the dotted line around global save control 12g). Based on selection of global save control 12g, the modifications to the filtered customer transactions module will be made globally—across all palettes and across all graphs and computer programs that include that module. Had the user selected local save control 12h instead, the modifications would have only been applied to palette 12a and the graph that is being defined in configuration portion 12e.

Configuration portion 12e also includes portion 12aa with controls 12oa, 12o-12u for the configuration and definition of a new module—a send offer module. Control 12oa specifies a data source for the send offer module. In this example, the data source for the send offer modules is the filtered customer transactions module. In this example, controls 12o-12q specify a trigger to occur—namely, to send an SMS message asking a user whether he/she wants to upgrade to unlimited texts. In this example, control 12r specifies a particular event to be waited for (i.e., to be received prior to performance of an action, specified by a subsequent trigger). Controls 12s-12u specify an action or trigger to be performed (e.g., the sending of a SMS message that states: "upgrade texting for $12.99/month). In this example, because the send offer module is being newly defined in portion 12aa, there is no option for a local save (which would result in a version of a previously defined module being saved locally for palette 12a). In this example, portion 12aa includes global save control 12v, selection of which results in the send offer module being added to a global palette, a palette which is used in generating all graphs. In this example, a user has not selected global save control 12v. As such, the send offer module will only be available on the local palette, palette 12a. In this example, configuration of the send offer module itself causes visual representation 12d to be included in palette 12a—as a module that is being defined locally and available locally for the graph that is being defined through configuration portion 12e.

Configuration portion 12e also includes portion 12ab for defining an output file module (represented by visual representation 12dd) in which to save results of sending the offers. Portion 12ab includes control 12w for specifying a data source for the output file module. In this example, control 12w specifies that the data source is the send offer module. A user may specify this by dragging and dropping visual representation 12d into control 12w. Portion 12ab also includes control 12x for specifying a data target. In this example, a user drags and drops visual representation 12dd into control 12x to specify that the output module (represented by visual representation 12dc) is the data target for the output file module defined through portion 12ab.

In general and thus applicable to all examples and embodiments, contents of configuration portion 12e (and/or data generated from or based on the contents of configuration portion 12e) define a specification that specifies which modules are to be included in a computer program and values of parameters for those modules. Configuration portion 12e may also include submission control 12t, selection of which causes a computing system, such as the transformation environment 5 described in FIG. 1A, to transform the specification specified by contents of configuration portion 12e into a computer program, which in this example is depicted by computer program 14 (which in this example is a dataflow graph).

In this example, computer program 14 includes data sources 14a, 14b, filtered customer transactions module 14c, send offer module 14d and output file source 14e. In this example, the computerized system configures data source 14a to access data records and/or files from "A_Customers," which specifies a particular external module (e.g., a data warehouse) from which to pull data. The computerized system configures data source 14b to be the B_name_address module. The computerized system configures filtered customer transactions module 14c in accordance with the information input into portion 12ac for filtered customer transactions module 14c. In particular, filtered customer transactions module 14c includes dataflow graph 14y with components (e.g., dataflow graph components) 14f, 14h-14l. In this example, component 14f is a filter component (hereinafter filter component 14f). Components 14h, 14i are partition components (hereinafter partition components 14h, 14i). Components 14j, 14k are sort components (hereinafter sort components 14j, 14k). Component 14l is a join component (hereinafter join component 14l).

In this example, filter component 14f is configured in accordance with the input specified in controls 12i-12k. That is, filter component 14f is configured to filter out records which fulfill a predetermined condition, such as those data records with an aggregate transaction amount less than $260. In this example, join component 14l is configured in accordance with the information specified by controls 12m-12n, namely, to join data records with matching or similar values for a Customer ID field. In this example, partition components 14h, 14i and sort components 14j, 14k are not specified in the specification, i.e., are not specified by input into configuration portion 12e. However, the computerized system includes partition components 14h, 14i and sort components 14j, 14k based on execution of executable logic (by the computerized system) that specifies that a join component is preceded by a partition component, which is preceded by a sort component. In this example, send offer module 14d is configured in accordance with information input into controls 12oa, 12o-12u. In particular, send offer module 14d is configured to wait for a data record (e.g., an event) specifying that a response has been sent. Upon detection of that event, send offer module 14d is configured to send an SMS message with the following contents: "Upgrade to unlimited texting for $12.99/mo." Output file source 14e is configured to save an output of execution of computer program 14 in a data repository, in accordance with contents of portion 12ab.

In this example, each of data sources 14a, 14b, filtered customer transactions module 14c, and send offer module 14d includes output ports 14m-14p, respectively, that specify an output data format that specifies which fields (e.g., from structured data items such as data records received from data sources 14a, 14b) are output from that source or module. In other words, each module and source is configured to output only values of those fields that are accessible to that module/source and are accessed by one or more downstream modules. In this example, filtered customer transactions module 14c includes input ports 14q, 14r (for data sources specified by controls 12f and 12m) and output port 14o (e.g., to output data and/or data records that are input into the sender offer module 14d), send offer module 14d includes input port 14s and output port 14p and output file source 14e includes input port 14t. An input port is configured to receive one or more structured data items from another module. An input port may also be configured with one or more data formats required for the received structured data items.

Figure 2C:
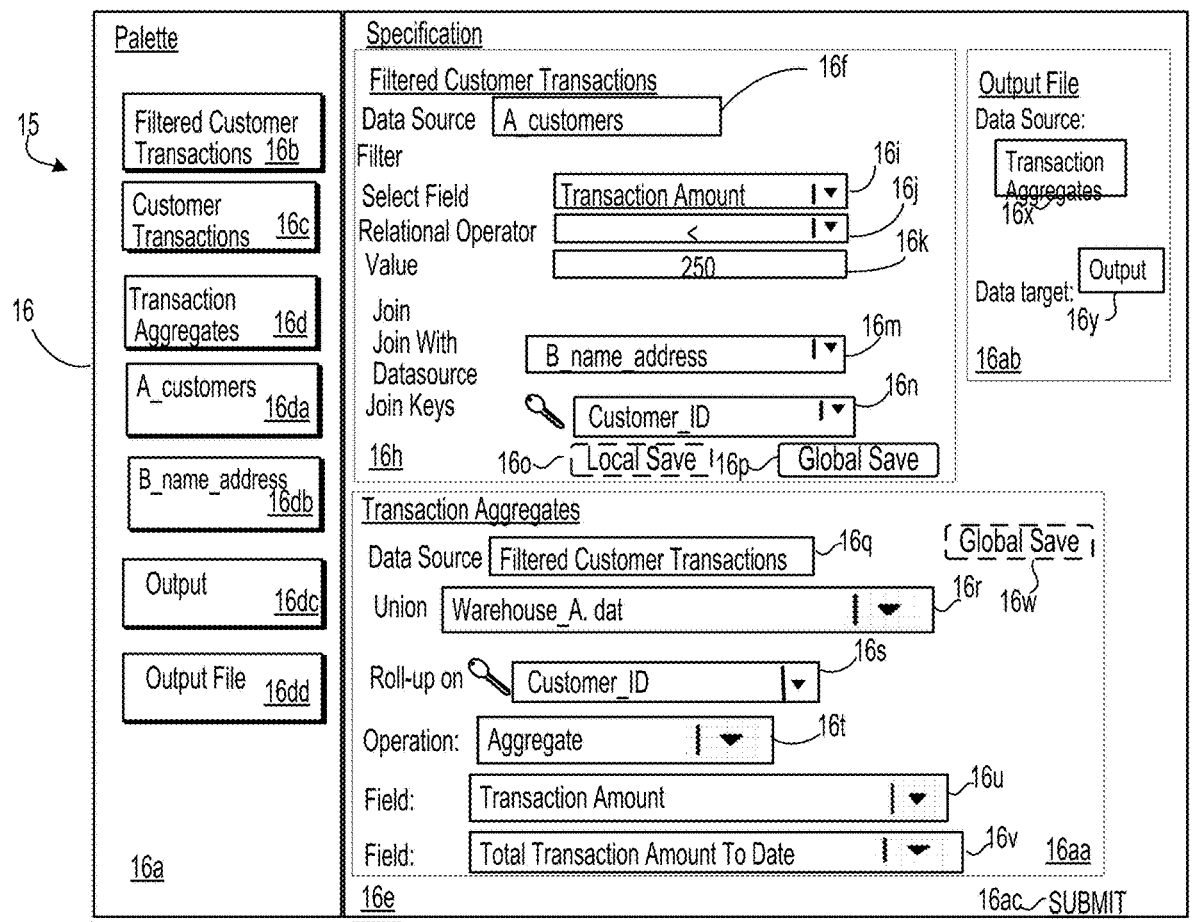
Figure 2C:
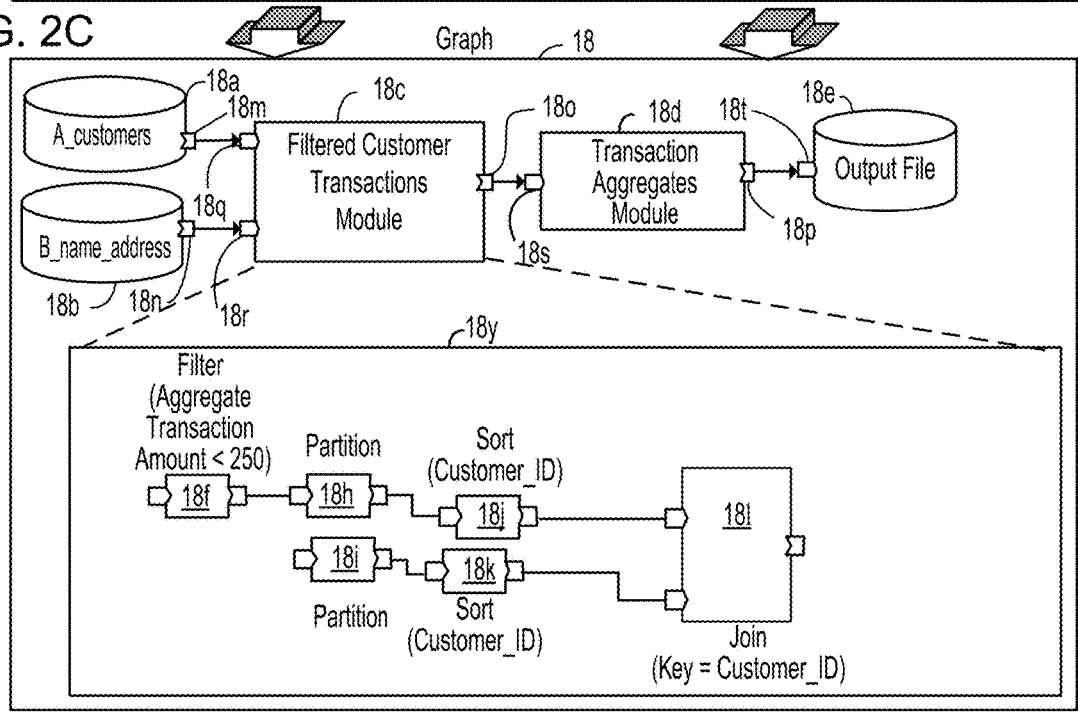

Referring to FIG. 2C, diagram 15 shows a variation of FIG. 2B, in which the filtered customer transactions module (e.g., the filtered customer transactions module generated through graphical user interface 10 in FIG. 2A) is used as part of a computer program that differs from computer program 14 depicted in FIG. 2B.

Diagram 15 shows graphical user interface 16, which includes palette portion 16a and configuration portion 16e. Palette portion 16a displays a plurality of modules available in defining a computer program. In this example, palette portion 16a displays visual representations 16b-16d and 16da-16dd. Each of visual representations 16b-16d and 16da-16dd is selectable and can be "dragged and dropped" into configuration portion 16e, for example, to add a module to a computer program or in defining a new module. In this example, visual representation 16b represents the filtered customer transactions module that was originally created through specification of input into graphical user interface 10, as shown in FIG. 2A, and was then updated (through a global save) in portion 12ac of FIG. 2B. In this example, palette portion 16a does not include a visual representation for the send offer module defined in FIG. 2B, as the send offer module was only defined locally and not added to the global palette. Configuration portion 16e provides a user interface for selecting, from the palette displayed in palette portion 16a, data (e.g., one of visual representations 16b-16d and 16da-16dd) representing modules to be included in a computer program or a dataflow graph. In this example, configuration portion 16e includes portions 16h, 16aa, 16ab.

In this example, portion 16h provides for modification (via controls 16f, 16i-16k and 16m-16n) of the filtered customer transaction module originally defined in FIG. 2A and modified in FIG. 2B. In this example, the user saves the modifications to the filtered customer transaction module locally, via selection of local save control 16o. In this example, portion 16h also includes global save control 16p, to provide the option of saving the modifications to the filtered customer transactions module globally (i.e., defining a global scope for the modifications, rather than a local scope). Each of controls 16f, 16i-16k and 16m-16n is pre-populated based on selections or data input into controls 10r, 10s, 10t, 10v, 10w, 10y (FIG. 2A), respectively, and then modified through controls 12f, 12i-12k and 12m-12n in FIG. 2B. The data in each of controls 16f, 16i-16k and 16m-16n is modifiable to enable user customization of the filtered customer transactions module.

Configuration portion 16e also includes portion 16aa with controls 16q-16v for the configuration of a transaction aggregates module, which is being newly defined in portion 16aa. In this example, control 16q specifies a data source for the transaction aggregates module. In this example, the data source is the filtered customer transactions module. Visual representation 16b, representing the filtered customer transactions module, is dragged and dropped into control 16q. Control 16r is for specifying a data source to be unioned (joined) with the output from the filtered customer transactions module. Control 16s is for receiving data specifying a key on which to perform a data roll-up, e.g., from the records included in Warehouse_A.dat and output from the filtered customer transactions module. Control 16t specifies an operation to be performed on a field (included in the rolled-up records) specified by control 16u and another field (included in the rolled-up records) specified by control 16v. In this example, portion 16aa includes global save control 16w to add the transaction aggregates module to the global palette, e.g., to be accessible to all users in all palettes. Because transaction aggregates module is being newly defined in portion 16aa, there is no local save control, e.g., which provides for local saving of modified versions of a globally accessible module.

Configuration portion 16e also includes portion 16ab for defining an output file module for saving an output. In this example, control 16x specifies that the data source for the output file module is the transaction aggregates module. A user may specify this by dragging and dropping visual representation 16d into control 16x. Additionally, control 16y specifies that the output module, represented by visual representation 16dc, is the data target for the output file module defined in portion 16ab. In this example, once a user has specified values for controls 16x, 16y, palette 16a is updated to include visual representation 16dd representing the output file module.

Configuration portion 16e also includes submission control 16ac, selection of which causes a computing system, such as transformation environment 5 in FIG. 1A, to transform the specification specified by contents of configuration portion 16e into a computer program, which in this example is depicted by computer program 18 (which in this example is a dataflow graph).

In this example, computer program 18 includes data sources 18a, 18b, filtered customer transactions module 18c, transaction aggregates module 18d and output file source 18e. In this example, the computerized system configures data source 18a to access data records and/or files from the A_Customers module. The computerized system configures data source 18b to be the B_name_address module. The computerized system configures filtered customer transactions module 18c in accordance with the information input into portion 16h for filtered customer transactions module 18c. In particular, filtered customer transactions module 18c includes dataflow graph 18y with components 18f, 18h-18l. In this example, component 18f is a filter component (hereinafter filter component 18f). Components 18h, 18i are partition components (hereinafter partition components 18h, 18i). Components 18j, 18k are sort components (hereinafter sort components 18j, 18k). Component 18l is a join component (hereinafter join component 18l).

In this example, filter component 18f is configured in accordance with the input specified in controls 16g, 16i-16k. That is, filter component 18f is configured to filter out those data records, which fulfill a predetermined condition—such as those records with an aggregate transaction amount less than $250. In this example, join component 18l is configured in accordance with the information specified by controls 16m-16n, namely, to join data records with matching or similar values for a Customer ID field. In this example, partition components 18h, 18i and sort components 18j, 18k are not specified in the specification, i.e., are not specified by input into configuration portion 16e. However, the computerized system includes partition components 18h, 18i and sort components 18j, 18k based on execution of executable logic (by the computerized system) that specifies that a join component is preceded by a partition component, which is preceded by a sort component. In this example, transaction aggregates module 18d is configured in accordance with information input into portion 16aa. In particular, transaction aggregates module 18d is configured to aggregate values in the "transaction amount" field with values in the "total transaction amount to Date" field. Output file source 18e is configured to save an output of execution of computer program 18 in a data repository, as specified by the output file module defined in portion 16ab. In this example, each of data sources 18a, 18b, customer transactions module 18c, and transaction aggregates module 18d includes output ports 18m-18p, respectively, that specify an output data format that specifies which fields (e.g., from data records received from data sources 18a, 18b) are output from that source or module. As described above and below, each module and source is configured to output only values of those fields that are accessible to that module/source and are accessed by one or more downstream modules. In this example, customer transactions module 18c includes input ports 18q, 18r, transaction aggregates module 18d includes input port 18s and output file source 18e includes input port 18t. An input port is configured to receive one or more structured data items from another module. An input port may also be configured with one or more data formats required for the received structured data items.

Figure 2D:
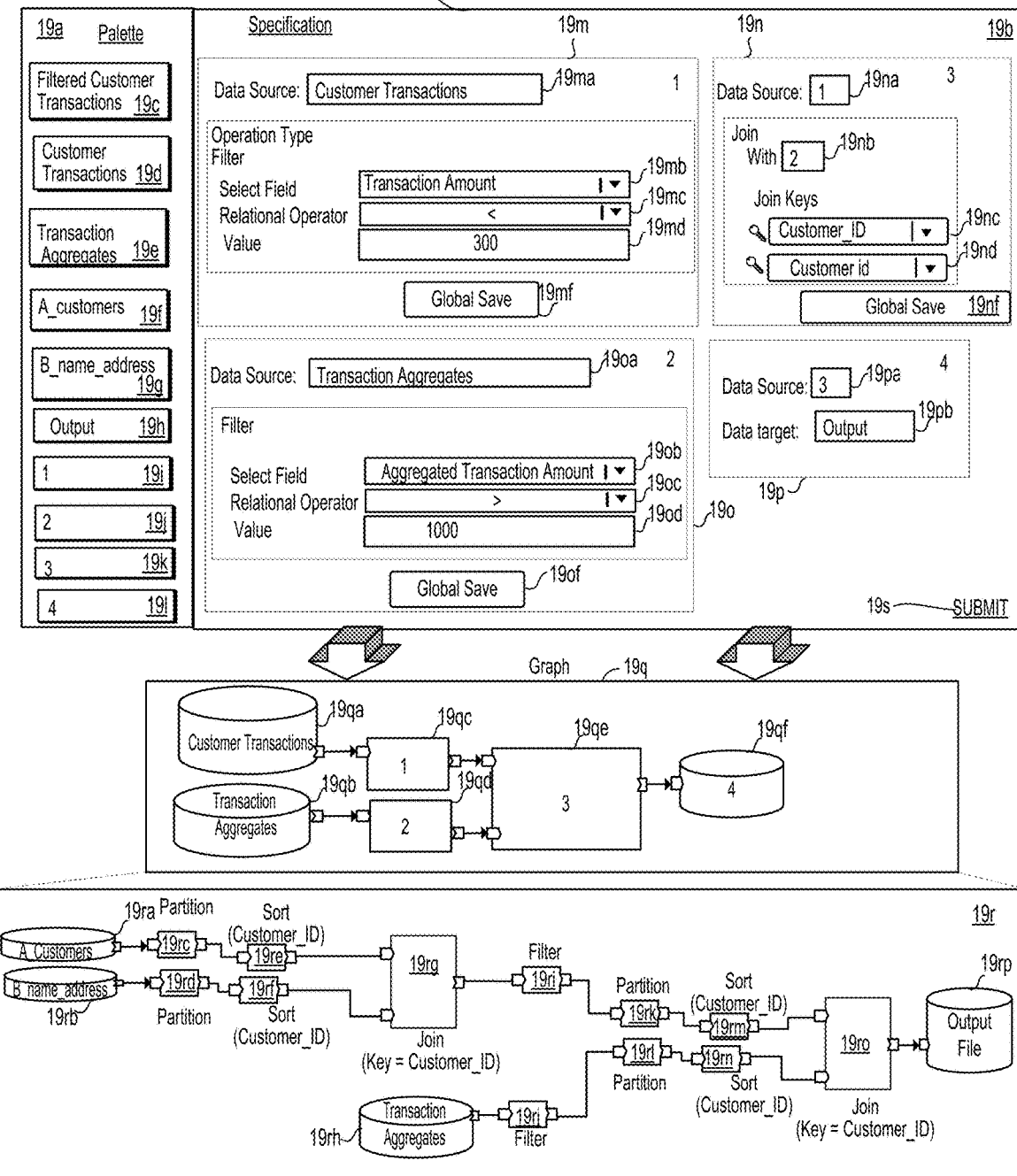

Referring to FIG. 2D, diagram 20 illustrates a transformation of a specification into a graph. In this example, graphical user interface 19 is shown in diagram 20. In this example, graphical user interface 19 includes palette portion 19a and specification portion 19b for defining a specification. Palette portion renders visual representations 19c, 19d, 19e, 19f, 19g, 19h, 19i, 19j, 19k, 19l of various modules that are previously defined available for use in defining a specification (e.g., the filtered customer transactions module, the customer transactions module, the transaction aggregates module, the A_customers module, the B_name_address module, and the output module, represented by visual representations 19c, 19d, 19e, 19f, 19g, 19h, respectively) or that have been added to palette 19a only after having been newly defined in specification 19b (e.g., modules 1, 2, 3, 4, represented by visual representations 19i, 19j, 19k, 19l, respectively).

In this example, a user defines a new module—module 1—in module 1 area 19*m* of specification portion 19*b*. Module 1 area 19*m* includes control 19*ma* for defining a data source for module 1. In this example, a user drags and drops visual representation 19*d* into control 19*ma* to specify that the customer transactions module is the data source for module 1. Module 1 area 19*m* also includes controls 19*mb*, 19*mc*, 19*md* for defining a filter operation to be performed on the data records output from the customer transactions module. In this example, module 1 area 19*m* also includes controls (not shown) for selecting a type of operation to be performed, which in this case is a filter operation. Module 1 area 19*m* also includes global save control 19*mf* for adding module 1 to the global palette. Module 1 area 19*m* does not include a local save control, because module 1 is being newly defined—as such it is not possible for the system to save down a local copy of a previously defined module. In this example, the user does not select global save control 19*mf*. Rather, the defining of module 1 itself is sufficient to add module 1 to a local palette (for the graph being defined) by adding visual representation 19*i* to palette portion 19*a*.

In this example, specification portion 19*b* also defines another new module—module 2—in module 2 area 19*o*. In this example, module 2 area 19*0* includes control 19*oa* for defining a data source for module 2. In this example, visual representation 19*e* is dragged and dropped into control 19*oa* to specify that the transaction aggregates module 19*e* is the data source for module 2. Module 2 area 19*0* also includes controls 19*ob*-19*od* to specify attributes of a filter operation, e.g., that was itself specified through selection of another control (not shown). Module 2 area 19*0* includes global save control 19*of*, selection of which adds module 2 to the global palette. In this example, the specification of a definition of module 2 in module 2 area 19*0* causes visual representation 19*j* to be added to palette portion 19*a*.

Specification portion 19*b* also defines new module 3 in module 3 area 19*n*. Module 3 area 19*n* includes control 19*na* for specifying a data source for module 3. In this example, module 1 is the data source for module 3 and this is specified by dragging and dropping visual representation 19*i* into control 19*na*. Module 3 area 19*n* also includes controls 19*nb*, 19*nc*, 19*nd* to specify the attributes of a join operation (which is itself specified through selection of another control for selecting an operation type). In this example, the output of module 1 is joined with the output of module 2, as specified by control 19*nb*. In this example, a user may have dragged and dropped visual representation 19*j* into control 19*nb*. Additionally, controls 19*nc*, 19*nd* specify the names of keys (i.e., fields) of the records output from modules 1, 2, respectively, on which to perform the join. Module 3 area 19*n* also includes global save control 19*nf*, selection of which adds module 3 to a global palette. In this example, global save control 19*nf* is not selected. Rather, defining module 3 is itself sufficient to add visual representation 19*k* to palette portion 19*a*.

Specification portion 19*b* also defines new module 4 in module 4 area 19*p*, which includes control 19*pa* for specifying a data source for module 4 and control 19*pb* for specifying a data target for module 4. In this example, module 3 is the data source for module 4 and the output module (represented by visual representation 19*h*) is the data target. In this example, defining module 4 in module 4 area 19*p* adds visual representation 19*l* to palette portion 19*a*.

Specification portion 19*b* also includes submission control 19*s*, selection of which causes the system, such as the transformation environment 5 in FIG. 1A, to transform the specification defined in specification portion 19*b* into a graph 19*q*. In this example, graph 19*q* includes customer transactions data source 19*qa*, transaction aggregates data source 19*qb*, module 1 19*qc*, module 2 19*qd*, module 3 19*qe* and module 4 19*qf*. In this example, many of the data sources and modules included in graph 19*q* encapsulate other modules, data sources and/or components. In this example, graph 19*r* shows an uncollapsed view of graph 19*q*, in which the contents of each encapsulated module and/or data source are shown. Graph 19*r* includes components (some of which are data sources) 19*ra*-19*rp*. In this example, components 19*ra*-19*rg* are included in the customer transactions module, which is defined as the data source for module 1. In this example, component 19*ri* represents the filter functionality defined by controls 19*mb*-19*md*. In this example, components 19*rh* and 19*rj* represent module 2. Components 19*rk*-19*ro* represent module 3. As previously described, the system is configured to insert partition and sort components before a join component. Lastly component 19*rp* represented module 4. As shown in FIGS. 2B-2D, a module can be used in different ways in different specifications in defining different graphs. In some examples, the data processing system describes herein transforms a specification into a dataflow graph as follows. The data processing system accesses, in data storage system, a data structure that maps data representing portions of the specification to the dataflow graph components and identifies, in the data structure, an item of data representing a particular portion of the specification. The data processing system also identifies, in the data structure, which dataflow graph component is mapped to the particular portion of the specification; and adds the identified dataflow graph component to the dataflow graph in accordance with an order of execution of operations specified by the specification.

Figure 2E:
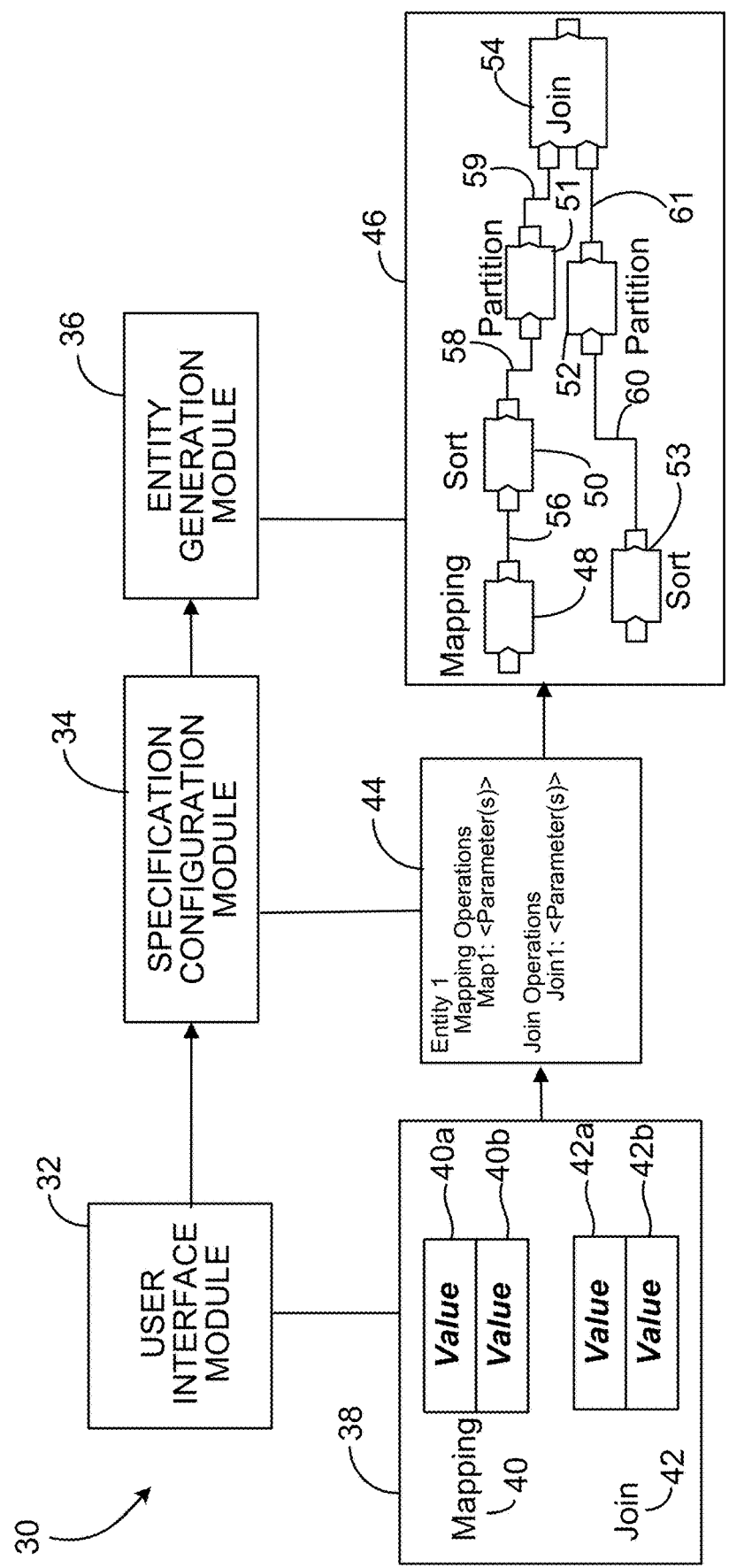
FIG. 2E is a diagram showing receiving user input for a specification and generating an entity from the specification.

Referring to FIG. 2E, diagram 30 includes user interface module 32, specification configuration module 34 and entity generation module 36 that are also described above in context of FIG. 1A. The user interface module 32 displays (or causes display of) user interface 38 for configuring a particular entity (e.g., "entity 1" in FIG. 2E). User interface 38 includes portion 40 for receiving one or more values of parameters for an operation, such as a mapping operation, that is included in the entity being configured through user interface 38. In this example, portion 40 includes fields 40*a*, 40*b* for input of values of parameters used in the operation. User interface 38 may also include portion 42 for input of values of parameters for another operation, such as a join operation. In this example, portion 42 includes fields 42*a*, 42*b* for input of those values. In this example, user interface 38 is for configuring an already defined entity. In a variation, the user interface can be rendering for defining a new entity, e.g., by specifying which parameters, operations and/or dataflow graph components are to be included in the entity.

Based on data entered into fields 40*a*-40*b* and 42*a*-42*b* of user interface 38, specification configuration module 34 generates specification 44 specifying the particular entity. The data processing system (e.g., the transformation environment 5 (FIG. 1A) that performs the specification to dataflow graph transformation and includes one or more of user interface module 32, specification configuration module 34, and entity generation module 36) may receive (e.g., from a client device displaying or rendering user interface 38) a request (e.g., an XML, message or other data) that specifies the one or more values for the fields 40*a*-40*b*, 42*a*-42*b*. The request may also specify the type of operation (e.g., a mapping operation, a join operation and so forth) for which each value is specified. Based on contents of the request, specification configuration module 34 generates the specification 44. The transformation environment 5 (FIG. 1A) may check the values received via the user interface 38 or via the request for compliance with predetermined criteria associated with the corresponding operation of the particular entity and may output a notification to the user (e.g., via the user interface 38 or via a response message to the client) whether the received values comply with the predetermined criteria. In case the transformation environment 5 determined that some of the received values do not comply with the predetermined criteria, the notification (such as a warning) may also include information guiding the user in submitting new one or more values for the corresponding operation of the particular entity that comply with the predetermined criteria. In other words, the transformation environment 5 (e.g., the user interface 38) may provide a guided user-machine interaction process, which ensures proper operation of the underlying system or entity, e.g., by ensuring that that the finally received values do comply with the predetermined criteria.

The above mentioned request may include the content shown in the below Table 1:

TABLE 1

| Operation Type: Mapping |
| --- |
| Parameter 1: Value 1 (40a) |
| Parameter 2: Value 2 (40b) |
| Operation Type: Join |
| Parameter 1: Value 1 (42a) |
| Parameter 2: Value 2 (42b) |

As shown in the above table, contents of the request include data specifying various operation types. For each operation type, the request specifies one or more parameters and one or more specified (e.g., user input) values for each parameter. The specification configuration module 34 uses contents of the request to generate specification 44 for the particular entity. For example, specification configuration module 34 is configured with a set of rules that parse the request and generate the specification, e.g., specification 44. In this example, the specification specifies various operations for the particular entity (e.g., to be executed by that entity) and various parameters for each operation (along with associated parameter values).

The specification configuration module 34 may access a template for a specification (e.g., for an entity), as shown in the below Table 2:

TABLE 2

| Entity |
| --- |
| ____ Operations |
| ____ 1: <Parameter(s)> |
| ____ Operations |
| ____ 1: <Parameter(s)> |

As shown in the above Table 2, the template for the specification includes fields to be populated, e.g., based on contents of the request. In this example, there is a field for an operation type (i.e., _Operations) and there is another field to specify a first instance of that operation (i.e., _1). There is also another field to specify parameters (and associated values) for that instance of the operation. The populated version of the template is shown in FIG. 2E as specification 44. In a variation, the contents of the request itself (e.g., as shown in Table 1) are the specification, e.g., rather than having a separate template to be populated from contents of the request.

The entity generation module 36 may transform specification 44 into entity 46, e.g., by selecting from a data repository those dataflow graph components or data representing components that are specified by the operation types in specification 44. For example, specification 44 includes a "mapping" operation type and a "join" operation type. Based on these operation types, entity generation module 36 selects the dataflow graph components "mapping component 48" and "join component 54" for inclusion in entity 46.

The entity generation module 36 may access, in data storage system 3, a data structure that maps data representing portions of a specification to data representing components or dataflow graph components. Entity generation module 36 identifies, in the mapping, an item of data representing a particular portion of the specification. Entity generation module 36 identifies, in the mapping, which data representing a component or a dataflow graph component is mapped to the identified portion of the specification; and adds the identified data representing component or dataflow graph component to the entity 46 in accordance with an order of execution of operations specified by the user interface 38. In some examples, there is not a one-to-one mapping between data representing portion of a specification and data representing a particular one of the components. Rather, data representing a join can be mapped to multiple, different join components (or data representing the join components). In this example, the entity generation module 36 is configured to select an appropriate component.

Entity generation module 36 also selects other components, e.g., sort components 50, 53 and partition components 51, 52, which are not specified by either the specification or by input into user interface 38. In this example, entity generation module 36 is configured with rules specifying various operation types that precede various other operation types. For example, a key-based operation (e.g., a join or roll-up operation) is preceded by a partition and sort operations, e.g., to save memory during execution of the key-based operation. Generally, a key-based operation includes an operation that operates on data based on a key (or other unique identifier) for the data. In this example, the entity generation module 36 is programmed with a rule specifying that partition and sort operations precede a join operation. Based on this rule, entity generation module 36 includes sort components 50, 53 and partition components 51, 52 in entity 46, e.g., prior to the occurrence of join component 54 in entity 46.

In another example, entity generation module 36 is also programmed with a rule specifying that a partition operation follows a mapping operation, e.g., to save memory following execution of the mapping operation. Based on execution of this rule, entity generation module 36 includes sort component 50 in entity 46. Entity generation module 36 inserts edges 56, 58, 59, 60 and 61 (e.g., representing data flows) between components 48, 50, 52, 54 based on an order in which the various operations are listed (or otherwise occur) in specification 44 and/or based on an order specified by the rules. For example, based on execution of the above-described rule, sort component 50 is inserted between mapping component 48 and join component 54. Following this insertion, entity generation module 36 inserts edge 56 between mapping component 48 and sort component 50. Entity generation module 36 also inserts edge 58 between sort component 50 and partition component 51. Entity generation module 36 inserts edge 59 between partition component 51 and join component 54. Additionally, following insertion of partition component 52, entity generation module 36 inserts edge 60 between sort component 53 and partition component 52. Entity generation module 36 inserts edge 61 between partition component 52 and join component 54.

In a variation, specification configuration module 34 is configured with the above-described rules. Based on execution of these rules, specification configuration module 34 is configured to identify additional operations (e.g., a partition operation and a sort operation) to be included in specification 44 and in entity 46.

A system described herein is configured to reveal to a user (through user interface 38) only the minimum amount of complexity required for configuration of an entity. That is, a user is prompted for input specifying parameter values for the data operations that require user input for configuration (e.g., join and filter operations that require a user to input keys values on which to perform the join and/or the filter). However, other operations (e.g., partition and sort operations) that can be configured independently of user input are automatically configured and added to the entity—without the complexity of those data operations being revealed to the user. As such, only the minimum amount of complexity is revealed to the user.

Figure 3A:
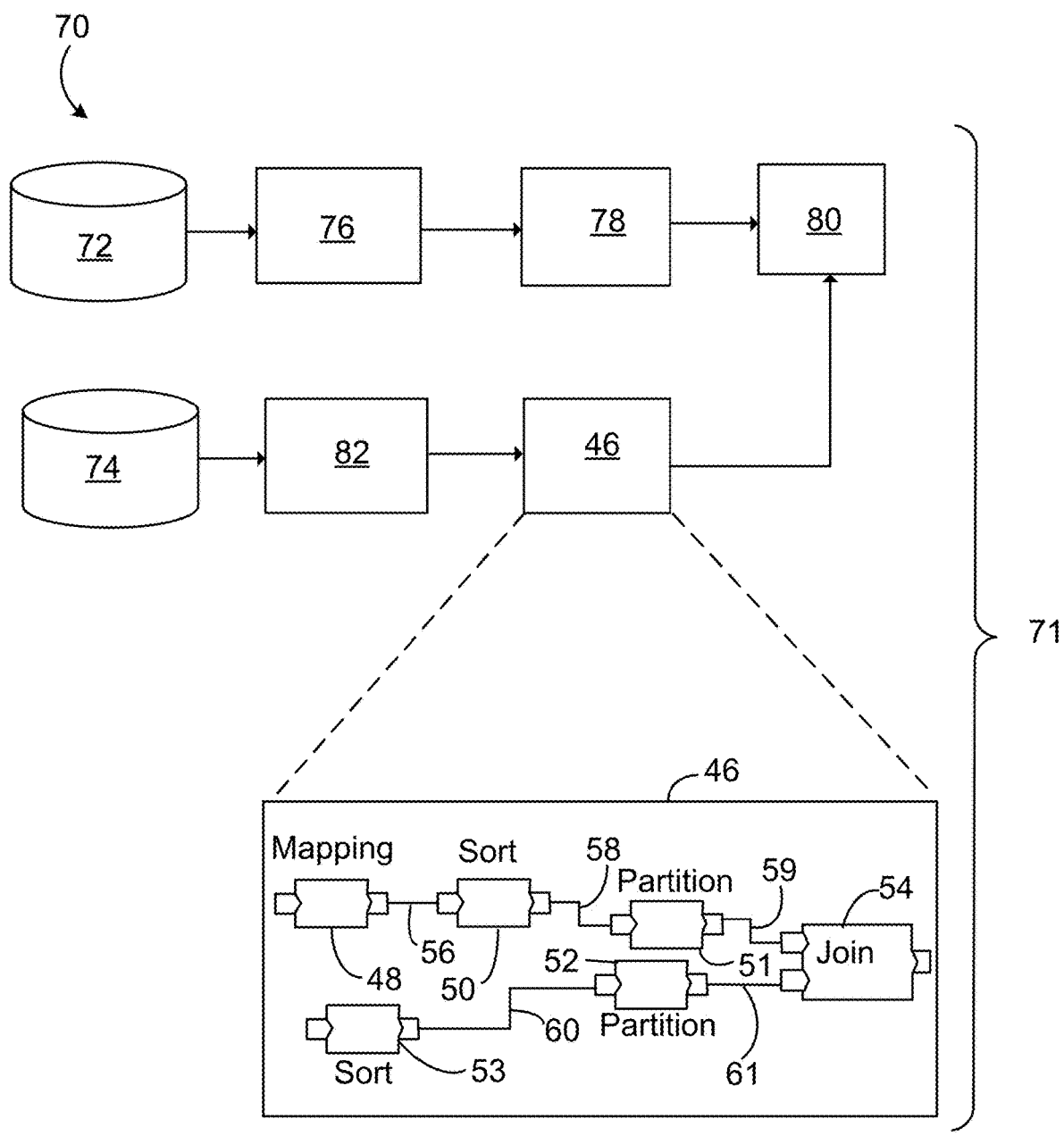
FIGS. 3A and 9 are each a diagram of a dataflow graph that includes entities.
Figure 3B:
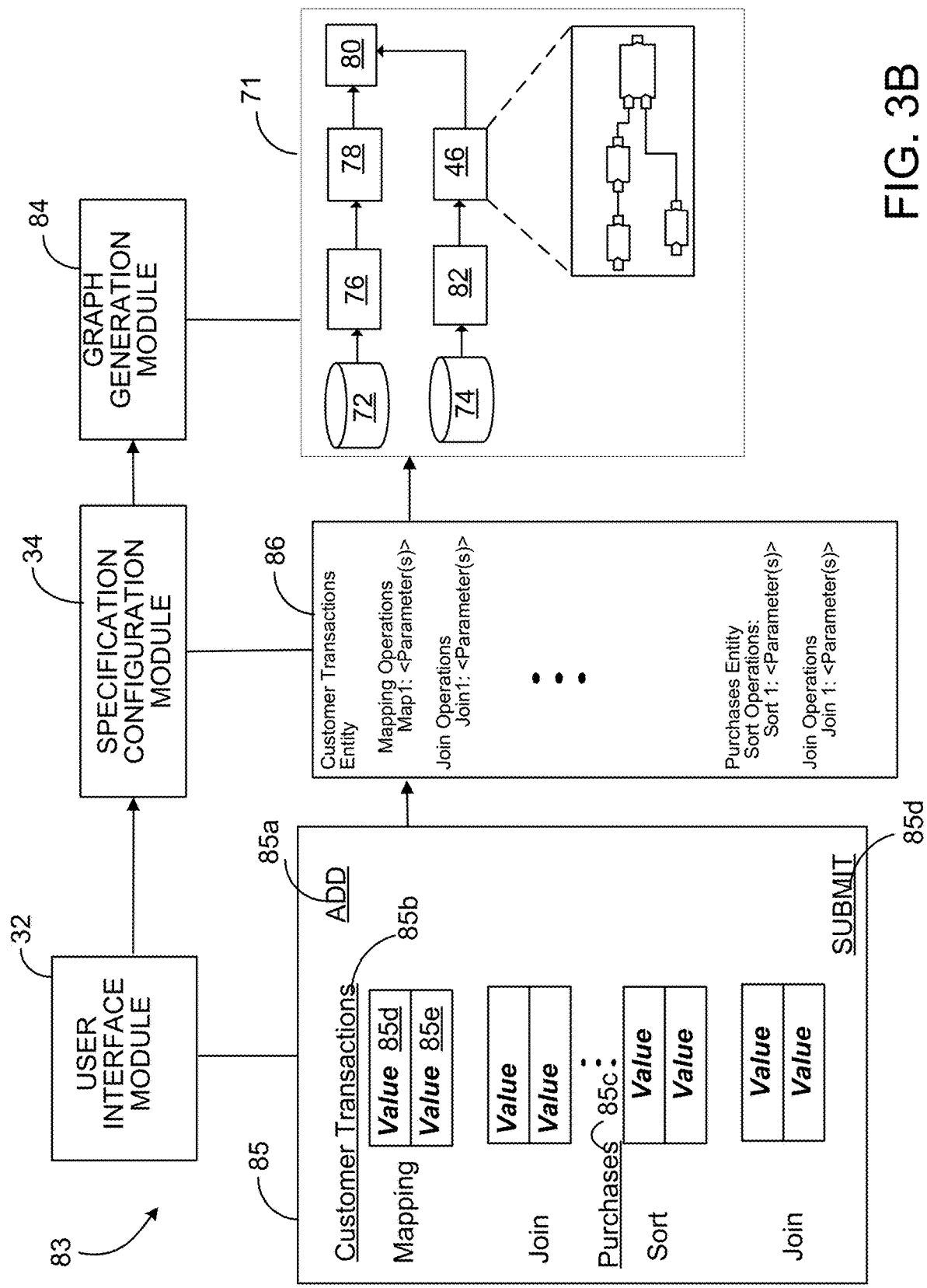
FIG. 3B is a diagram showing receiving user input for a specification and generating a computer program from the specification.

Referring to FIG. 3A, diagram 70 illustrates dataflow graph 71 generated from multiple entities 46, 76, 78, 80, 82, each of which are generated using the techniques described herein. In this example, each entity itself may include multiple other entities. As described in further detail below, the data processing system provides various user interfaces for selecting which entities to include in the dataflow graph and an execution order for the entities. In this example, dataflow graph 71 also includes data sources 72, 74. In this example, user interfaces are also provided for specification of the data sources and of the relationships among the data sources and entities included in the dataflow graph. In this example, a data source is field modifiable in that it is customizable on the user end and does not need to be specified ahead of time (e.g., can be specified at deployment or installation). Referring to FIG. 3B, diagram 83 illustrates a variation of FIG. 2E in which a specification is generated, based on user input, for a dataflow graph comprising multiple particular entities, rather than for an individual particular entity. However, the description in the context of FIG. 2E, with respect to the individual entity, also applies in a corresponding manner to each entity mentioned in context of FIG. 3B. In this example, user interface module 32 displays a user interface 85 for collecting all the parameter values (and/or configuration options for a dataflow graph). Based on the input collected through user interface 85, specification configuration module 34 generates specification 86 for all the entities included in the dataflow graph, e.g., using the techniques described herein such as in context of FIG. 2E. Based on specification 86, graph generation module 84 generates dataflow graph 71, which itself includes the various entities. By generating the entire dataflow graph, the system is able to identify and generate necessary dependencies and/or data flows among the entities. At least partly based on these dependencies and/or data flows, the system is able to specify input and output data formats for the entities and for the components of the entities.

In other words, the user interface module 32 displays (or causes display of) user interface 85 for configuring the multiple particular entities (e.g., "customer transactions entity" and "purchase entity" in FIG. 3B). User interface 85 includes a portion for receiving one or more values of parameters for an operation, such as a mapping operation, that is included in the entity (e.g., "customer transactions entity" in FIG. 3B) being configured through user interface 85. In this example, user interface 85 includes fields 85d, 85e for input of values of parameters used in the operation. User interface 85 may also include a portion for input of values of parameters for another operation for the same entity, such as a join operation. In this example, the portion may also include fields for input of those values. Based on data entered into fields of user interface 85, specification configuration module 34 generates specification 86 specifying the multiple particular entities.

In this example, user interface 85 displays a palette of entities (e.g., pre-defined entities) for selection. In this example, user interface 85 includes control 85a, selection of which displays a listing of various entities to be included in a computer program and/or a dataflow graph. In this example, a user has selected to include a "customer transactions" entity 85b and a "purchases" entity 85c in the computer program, e.g., among other entities. In this example, "customer transactions" entity 85b includes a mapping operation and a join operation. For the "customer transactions" entity 85b, user interface 85 enables a user to configure values of the mapping operation, e.g., via input boxes 85d, 85e for inputting values of parameters of the join operations. Input boxes are provided for configuring values of parameters of the join operation that is part of the "customer transactions entity" 85b and for configuring values of parameters of the sort and join operations that are included in "purchases" entity 85c.

In this example, user interface 85 includes control 85d, selection of which causes a client device rendering user interface 85 to send a request (e.g., an XML, message or other data) to a data processing system, such as transformation environment 5 (FIG. 1A), executing specification configuration module 34. In this example, the request specifies, for each particular entity, an entity name, types of data operations (e.g., a mapping operation, a join operation and so forth) performed by that entity and, for each type of data operation, values of respective parameters for that data operation. The request is sent to specification configuration module 34. Based on contents of the request, specification configuration module 34 generates the specification 86. The specification configuration module 34 may identify if there are any additional data operations to be included in the specification—using the techniques described herein. These additional data operations include data operations required to perform other data operations or data operations upon which specified data operations are dependent—but for which the user is not prompted to enter input values. The data processing system may check the values received via the user interface 38 (FIG. 2E) or the user interface 85 or via the request for compliance with predetermined criteria associated with the corresponding operation of the particular entity and may output a notification to the user (e.g., via the user interface 85 or via a response message to the client) whether the received values comply with the predetermined criteria. In case the data processing system determined that some of the received values do not comply with the predetermined criteria, the notification (such as a warning) may also contain information guiding the user in submitting new one or more values for the corresponding operation of the particular entity that comply with the predetermined criteria. In other words, the data processing system (e.g., the user interface 85) may provide a guided user-machine interaction process, which ensures proper operation of the underlying system or entity, e.g., by ensuring that that the finally received values do comply with the predetermined criteria.

From specification, graph generation module 84 generates dataflow graph 71, e.g., by selecting, from memory, entities (e.g., entities 76, 78, 80, 82, 46) corresponding to the entity names included in specification 86 and configuring values of parameters of those entities in accordance with values input into user interface 85. In an example, where an entity is not already pre-defined and stored in memory, graph generation module 84 generates the entity, e.g., by selecting from memory those components with names corresponding to the names of the various operations specified by the specification.

Figure 4:
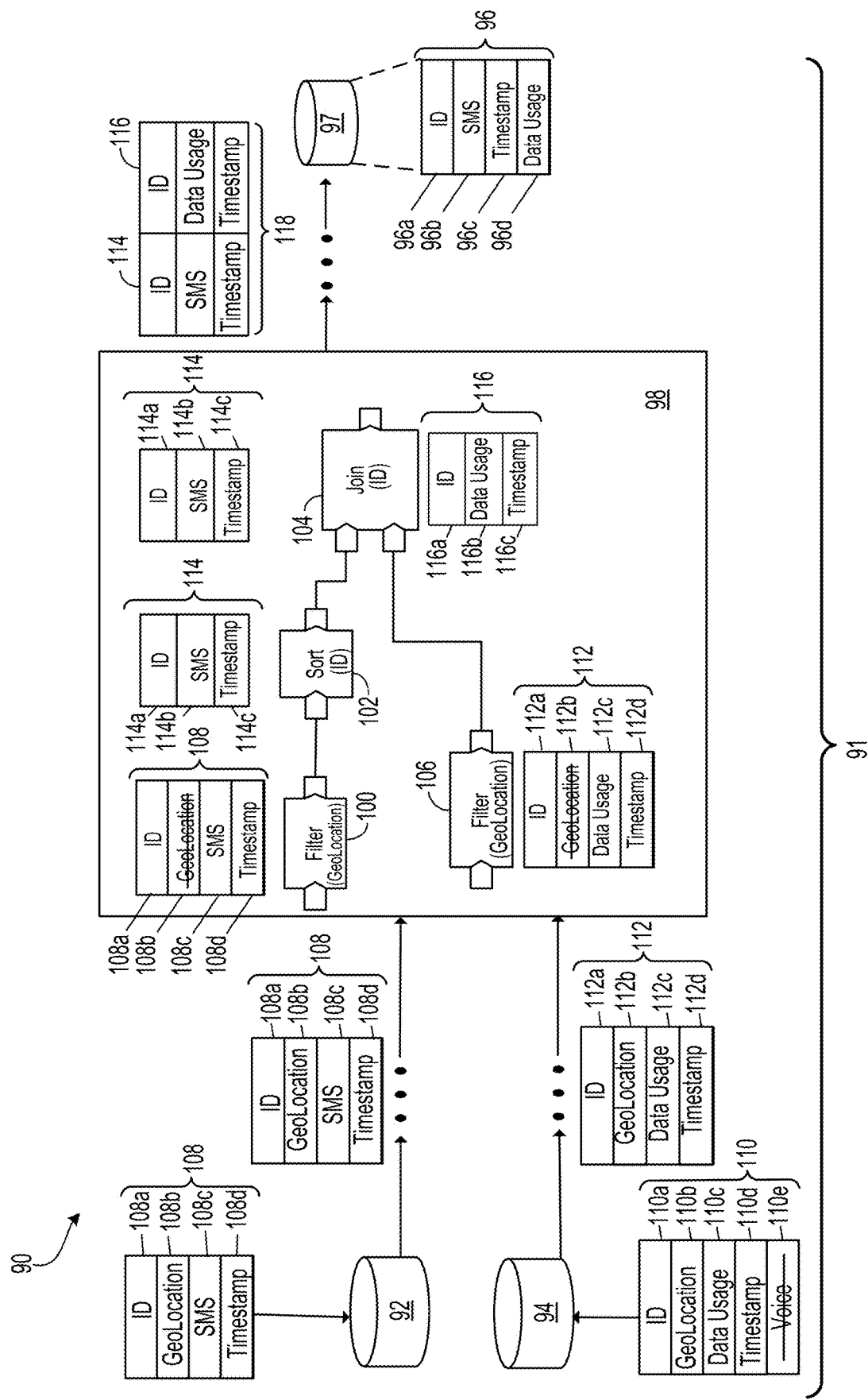
FIG. 4 is a diagram of processing of data records through a dataflow graph.

Referring to FIG. 4, diagram 90 illustrates how the data processing system, such as the data processing system 4 of FIG. 1A, is configured to "drop" or otherwise remove a field from a data record once the data processing system determines that the field is not required by any downstream or subsequent entities (or components included in an entity) in dataflow graph 91, which may be dataflow graph 71 (FIG. 3A). In this example, dataflow graph 91 includes data sources 92, 94, data sink 97 (e.g., a data repository for storage of data) and entity 98. Dataflow graph 91 may also include one or more other entities—as indicated by the ellipses (" . . . ") shown in dataflow graph 91.

There are numerous advantages to dropping fields once they are no longer used or processed by the dataflow graph. These advantages includes decreased latency in data record processing, because the data processing system is able to process smaller records (e.g., which result from the dropping of fields) more quickly, relative to a speed of data processing when the data processing system has to process an entire data record through a dataflow graph. Other advantages include decreased memory and resource consumption, as a smaller record (e.g., due to the dropping of fields) consumes less memory space during the processing of the record.

In this example, dataflow graph 91 includes entity 98, which in turn includes dataflow graph components 100, 102, 104, 106. Each of components 100, 106 is a filter component that filters records based on a geolocation field. As such, each of components 100, 106 requires that a data record has a geolocation field to properly perform the filtering. Component 102 is a sort component that is configured to sort data records, e.g., based on an ID or key of the data records. As such, component 102 requires an ID field to properly perform the sort. Component 104 is a join component that is configured to perform a join on data records associated with a same or similar key or ID. As such, component 104 requires an ID field to properly perform a join operation. In this example, data sink 97 is configured to store data records (e.g., data record 96) with four fields (e.g., fields 96a-96d) for each processed data record. In this example, the four fields include an ID field 96a, an SMS field 96b, a timestamp field 96c and a data usage field 96d. As such, based on the fields specified for storage by data sink 97, processed records should include these four fields—to enable values of these fields to be stored in data sink 97.

In this example, data source 92 receives a structured data item, such as data record 108, which includes ID field 108a, GeoLocation field 108b, SMS field 108c and timestamp field 108d. In this example, each of fields 108a-108d is required by a downstream entity or data sink. For example, field 108a is required by components 102, 104 and data sink 97. Field 108b is required by component 100. Field 108c is required by data sink 97. Field 108d is required by data sink 97. As such, the data processing system does not drop any fields from data record 108 and data record 108 is sent in its entirety to the next entity in dataflow graph 91.

In this example, data source 94 receives data record 110, which includes ID field 110a, GeoLocation field 110b, data usage field 110c, timestamp field 110d and voice field 110e. ID field 110a is used by downstream entities and components (i.e., component 104 and data sink 96) in dataflow graph 91. GeoLocation field 110b is used by component 106. Data usage field 110c is used by data sink 97. Timestamp field 110d is used by data sink 97. However, voice field 110e is not used by any of the downstream components or entities. As such, the data processing system drops voice field 110e from data record 110 (as visually shown by the strikethrough of "Voice"). In this example, data source 94 sends data record 112 (with fields 112a-112d and not with the dropped field 110e) to the next entity in dataflow graph 91. Data record 112 is a version of data record 110 with field 110e removed. That is, in this example, data record 112 is the same as data record 110, except that data record 112 does not include field 110e. In this example, fields 112a-112d are the same as fields 110a-110d, respectively. This may be done by formatting the output data format of the data source 94 before execution of the dataflow graph for data processing during transformation of the specification, which is associated with the data source 94, into the data source 94 such that the voice field 110e is removed or dropped from the data record 110 before the data record 110 is outputted as data record 112 by the data source 94 for further downstream processing by downstream entity 98.

In this example, entity 98 receives data record 108. The data processing system executes component 100 against data record 108, e.g., to determine whether to continue processing data record 108 or if data record is filtered out without further processing. In this example, based on the value in geolocation field 108b, the data processing system determines that data record 108 does not satisfy the criteria of data records that are filtered out without further processing. The data processing system also determines that geolocation field 108b is not used or required by any of the downstream entities or components. For example, none of components 102, 104 or data sink 97 use a geolocation field. As such, the data processing system drops geolocation field 108b from data record 108, as shown by the strike through of "Geo-Location" above component 100. This may be done by formatting the output data format of the component 100 during transformation of the specification, which is associated with the entity 98, into the entity 98 such that the geolocation field 108b is removed or dropped from the data record 108 before the data record 108 is outputted as data record 114 by the component 100 for further downstream processing by downstream components 102, 104. The removal of geolocation field 108b results in data record 114, which is a version of data record 108. That is, data record 114 is a version of data record 108, in which geolocation field 108b is removed. In this example, data record 114 includes fields 114a-114c, which correspond to fields 108a, 108c-108d, respectively. Components 102 and 104 each process data record 114. In this example, no fields from data record 114 are dropped after processing by components 102, 104, because each of fields 114a-114c is required by data sink 97.

In this example, data record 112 is passed to entity 98, which executes component 106 against data record 112, e.g., to determine whether to continue processing data record 112 or if data record 112 is filtered out without further processing. In this example, based on the value in geolocation field 112b, the data processing system determines that data record 112 does not satisfy the criteria of data records that are filtered out without further processing. The data processing system also determines that geolocation field 112b is not used or required by any of the downstream entities or components. For example, neither component 104 nor data sink 97 use a geolocation field. As such, the data processing system drops geolocation field 112b from data record 112, as shown by the strike through of "GeoLocation" below component 106. This may be done by formatting the output data format of the component 106 during transformation of the specification, which is associated with the entity 98, into the entity 98 such that the geolocation field 112b is removed or dropped from the data record 112 before the data record 112 is outputted as data record 116 by the component 106 for further downstream processing by downstream component 104. The removal of geolocation field 112b results in data record 116, which is a version of data record 112. That is, data record 116 is a version of data record 112, in which geolocation field 112b is removed. In this example, data record 116 includes fields 116a-116c, which correspond to fields 112a, 112c-112d, respectively. Component 104 processes data record 116. In this example, no fields from data record 116 are dropped after processing by component 104, because each of fields 116a-116c is required by data sink 97.

In this example, component 104 joins together data records 114, 116 (e.g., as each of the data records has a same ID). The output of component 104 is data record 118, which includes data records 114, 116. In this example, each of data records 114, 116 is a sub-record of data record 118. Entity 98 transmits data record 118 to data sink 97 for storage.

In an example, a data processing system (such as data processing system 4 or transformation environment 5) executes three passes for each entity in a dataflow graph (e.g., dataflow graph 71 in FIG. 3A or dataflow graph 91 in FIG. 4) to identify which data fields can be deleted or otherwise removed from storage and when. That is, to decrease consumption of computing and memory resources, the data processing system is configured to "drop" or delete a field as soon as it can, e.g., when that field is no longer required by the dataflow graph and/or by entities in the dataflow graph. During a first pass, an entity of the dataflow graph broadcasts to other entities (e.g., other upstream entities) fields required by itself and any entities downstream of the entity. The entity that performs the broadcast is referred to as a broadcasting entity. In an example, the broadcasting entity broadcasts the required fields to one or more recipient entities (e.g., upstream entities) by sending to those upstream entities one or more messages that include data representing the required fields.

During a second pass, the recipient entities transmit to the broadcasting entity one or more messages specifying which recipient entities can provide (e.g., transmit to the broadcasting entity) values of the required fields. During a third pass, the broadcasting entity parses (or otherwise analyzes) the messages received from the recipient entities. In response, the broadcasting entity transmits back to the recipient entities data (e.g., messages) specifying which recipient entity is responsible for transmitting which field (and/or value of a field) to the broadcasting entity. In some examples, the data processing system executes these three passes. By doing so, each entity is configured with data (e.g., a formatted output data format) specifying which fields are required by downstream entities, including, e.g., the broadcasting entity. Generally, an entity (e.g., each entity) is configured with data specifying required fields by saving in memory and/or in a data repository data representing required fields and saving that data in association with a unique identifier for the entity. Then, during execution of the dataflow graph, the data processing system queries for this stored data, during execution of an entity. For example, upon execution of a particular entity, the data processing system looks up, in the database, the data for that entity (e.g., based on a unique identifier for the entity). As previously described, the looked-up data specifies which fields are required by downstream entities. In this example, the data processing system is configured to drop those fields (e.g., by deleting them from storage or by preventing storage of data for those fields) that are not required by downstream entities—e.g., upon completion of data processing by a current entity (e.g., an entity being currently executed and associated with stored data specifying which fields are and are not required by downstream entities).

Figure 5:
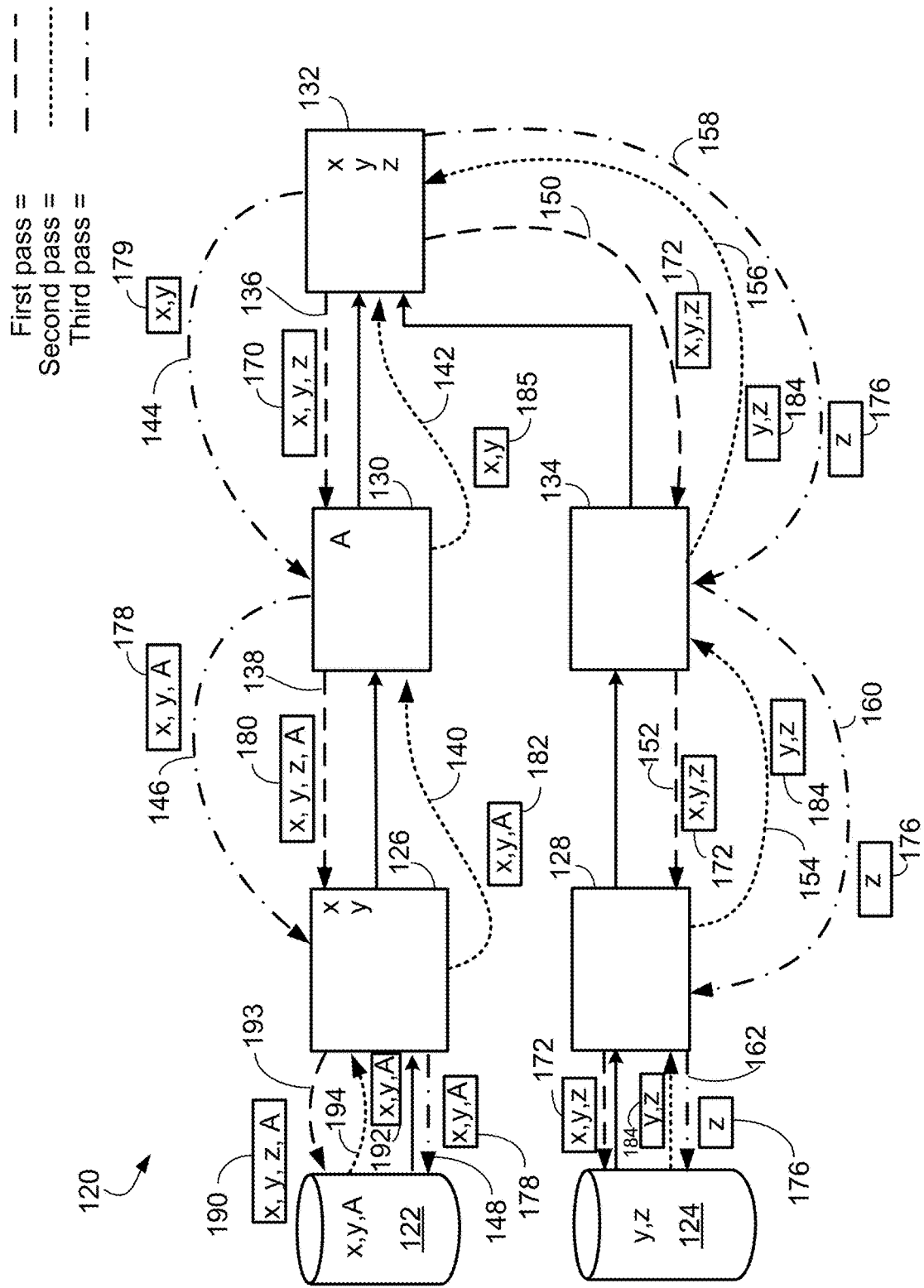
FIG. 5 is diagram of a process flow for field identification.

Referring to FIG. 5, diagram 120 illustrates a process performed by the data processing system in identifying which fields of a data record to drop and when. In this example, a dataflow graph include data sources 122, 124 and entities 126, 128, 130, 132, 134. In this example, an entity is transient in that the entity does not store values of the fields. In this example, entity 132 requires three fields: x, y, z. Entity 130 requires one field: A. Entity 126 requires two fields: x and y. Additionally, in this example, data source 122 stores (or otherwise has access to) data records with fields x, y, A.

To track which fields are required by which entities and when the data processing system can drop a field, the data processing system performs the following techniques as part of configuration of a dataflow graph and prior to data processing by the dataflow graph. First, entity 132 sends message 170 to entity 130, during a first pass as shown by arrow 136. Message 170 includes data specifying the fields that are required by entity 132. In this example, message 170 includes data specifying that fields x, y, z are required by entity 132. In turn, entity 130 receives message 170 and adds to message 170 any fields that are required by entity 130. In this example, entity 130 generates message 180, which is a version of message 170 and includes contents of message 170 (i.e., data representing fields x, y, x) as well as other data representing field A. During the first pass, the data processing system transmits message 180 from entity 130 to entity 126, as shown by arrow 138. In this example, entity 126 requires fields x and y (e.g., because entity 126 reads fields x and y). As such, entity 126 can respond to message 180 that entity 126 will have values for fields x, y. Entity 126 sends message 190 to data source 122 during the first pass, as shown by arrow 193. In this example, message 190 specifies that fields x, y, z, A are required, e.g., by one or more downstream entities. Because data source 122 stores (or otherwise accesses) values for fields x, y A, the data processing system causes message 192 to be transmitted from data source 122 to entity 126, as shown by arrow 194 during a second pass. In this example, message 192 specifies that data source 122 stores or otherwise has access to values for fields x, y, A. In turn during the second pass, the data processing system causes entity 126 to transmit message 182 to entity 130, as shown by arrow 140. In this example, message 182 specifies that entity 126 can transmit values for fields x, y, A to entity 130. In an example, the data processing system identifies which fields to specify or include in a message (transmitted from an entity) by identifying specified fields in an incoming message (to that entity) and then determining which of the specified fields are either required by an entity receiving the message or are accessible by the entity receiving the message. In this example, message 180 (which is received by entity 126) specifies fields x, y, z, A.

Entity 126 requires fields x, y. Therefore, entity 126 has access to values for fields x, y (by receiving these values from data source 122). As such, fields x, y are included in message 182. Even though entity 126 does not require field A, entity 126 has access to field A through data source 122. As such, entity 126 includes field A in message 182.

In this example, entity 130 receives message 182 and identifies which, if any, of the fields specified in message 182 are required by downstream entities. To make this determination, entity 130 compares contents of message 182 to contents of message 170. In this example, the data processing system is configured to generate another message specifying fields that represent overlap (e.g., overlapping fields) among fields specified in message 182 and fields specified in message 170. As such, the data processing system generates message 185 with data representing fields x, y, e.g., to specify that entity 130 can provide fields x, y to entity 132. During the second pass, entity 130 transmits message 185 to entity 132, as shown by arrow 142. Entity 130 also stores in memory or in a data repository data specifying that field A can be dropped or otherwise removed from storage, once field A is processed by entity 130. Now, when the dataflow graph shown in FIG. 5 is executed (in real-time) by data processing system 4 (FIG. 1A), the data processing system 4 (executing the dataflow graph) can determine to drop field A, following processing by entity 130, e.g., based on a data look-up in memory (or a data repository) of the data specifying to drop field A upon completion of data processing by entity 130.

In parallel with (or subsequent to) transmittal of message 170, entity 132 also transmits message 172 to entity 134, during the first pass as shown by arrow 150. In some examples, message 170 is a same message as message 172. In this example, message 172 specifies that fields x, y, z are required by entity 132. Entity 134 receives message 172. In this example, entity 134 does not require any fields of its own. As such, entity 134 forwards message 172 to entity 128, during the first pass as shown by arrow 152. Entity 128 forwards message 172 to source 124, which in turn responds with message 184, specifying that source 124 can provide fields y, z. In turn, entity 128 responds with message 184 specifying that entity 128 can provide values for fields y, z. In this example, entity 128 transmits message 184 to entity 134, as shown by arrow 154 during the second pass. In this example, entity 134 forwards message 184 to entity 132, as shown by arrow 156 during the second pass.

In this example, entity 132 has received two messages (i.e., messages 184, 185), each of which specify which fields that are required by entity 132 can be provided by upstream entities. In particular, message 184 specifies that fields x, y can be provided by entity 130. Message 184 species that fields y, z can be provided by entity 134. Since entity 132 can receive a value for field x from two different entities, entity 132 selects one of the entities from which to request and receive values for field x. In some examples, entity 132 randomly makes this selection. In other examples, entity 132 may select that entity that responded first.

In this example, entity 132 selects entity 130 for receipt of field x. As such, during a third pass, entity 132 transmits message 179 to entity 130, as shown by arrow 144. In this example, message 179 specifies that entity 132 is choosing to receive fields x, y from entity 130. In turn, entity 130 generates message 178 that specifies that entity 130 will receive values of fields x, y, A from entity 126. During the third pass, message 178 is transmitted from entity 130 to entity 126, as shown by arrow 146. During the third pass, entity 126 transmits message 178 to data source 122, as shown by arrow 148. In this example, data source 122 compares contents of message 178 to fields it stores or otherwise accesses, e.g., to determine which (if any fields) data source 122 can drop and delete from storage. In this example, the data processing system determines, based on contents of message 178, that all fields of data source 122 are required by downstream entities. As such, data source 122 is not configured to drop any fields.

In this example, entity 132 transmits message 176 to entity 134 specifying that entity 132 will receive field z from entity 134, as shown by arrow 158 during the third pass. In turn, entity 134 is configured by the data processing system to transmit a value of field z to entity 132. Entity 134 also transmits message 176 to entity 128, as shown by arrow 160 during the third pass. As such, entity 128 is also configured to transmit values for field z to entity 134. In turn, entity 128 forwards message 176 to data source 124, as shown by arrow 162 during the third pass. In this example, data source 124 compares contents of message 176 (i.e., specifying field z) to fields accessed by data source 124, which in this example are fields y, z. Based on the comparison, the data processing system determines that field y is not included in message 176. As such, the data processing system determines that no downstream entities are relying on data source 124 for values of field y. As such, data source 124 is configured to drop field y, e.g., upon execution of the dataflow graph shown in FIG. 5. In this example, data source 124 is configured to drop a field by not saving values for that field in memory.

In the foregoing description, it is described that entities transmit messages and receive messages. In an example, an entity transmits and/or receives messages by executable logic or code that represents the entity being executed and causing data to be generated that is then analyzed or interpreted by other executable code that represents another entity.

In the foregoing examples, the entities, e.g., entity 126 had read access to fields, e.g., rather than storing values for fields. In a variation, an entity may also store a value for a field. In this example, when an entity stores a value of a requested field, the entity does not need to go to an upstream entity and/or data source to determine if that upstream entity and/or data source can provide a value for the field. Rather, the entity—on its own—can respond to the downstream entity (requesting the field) that the upstream entity can provide the value of the fields.

In this foregoing example, an entity knows which fields to drop and when, because each entity either stores or has access to data specifying an input data format and an output data format for that entity. The output data format specifies fields for which the entity needs to output values. In an example, the output data format (or output fields or output format) specifies which fields that are required by one or more downstream (e.g., subsequently occurring) entities can be provided by a particular upstream entity. In this example, the upstream and downstream entities are part of a same dataflow through the dataflow graph. That is, the upstream entity is configured, via the output format, to provide these fields. The input data format specifies the fields for which the entity is configured to receive values. Generally, the input data format includes those fields required to be accessed or processed for an entity. As such, to determine which fields to drop and when, an entity parses or otherwise analyzes contents of its respective output data format.

In a variation, entity 132 is configured as follows: receive value of field y from entity 130, unless that value is null—in which case, receive value of field y from entity 134. In this variation, each of entities 126, 128, 130, 134 are configured with field y as part of the output data format.

Figure 6:
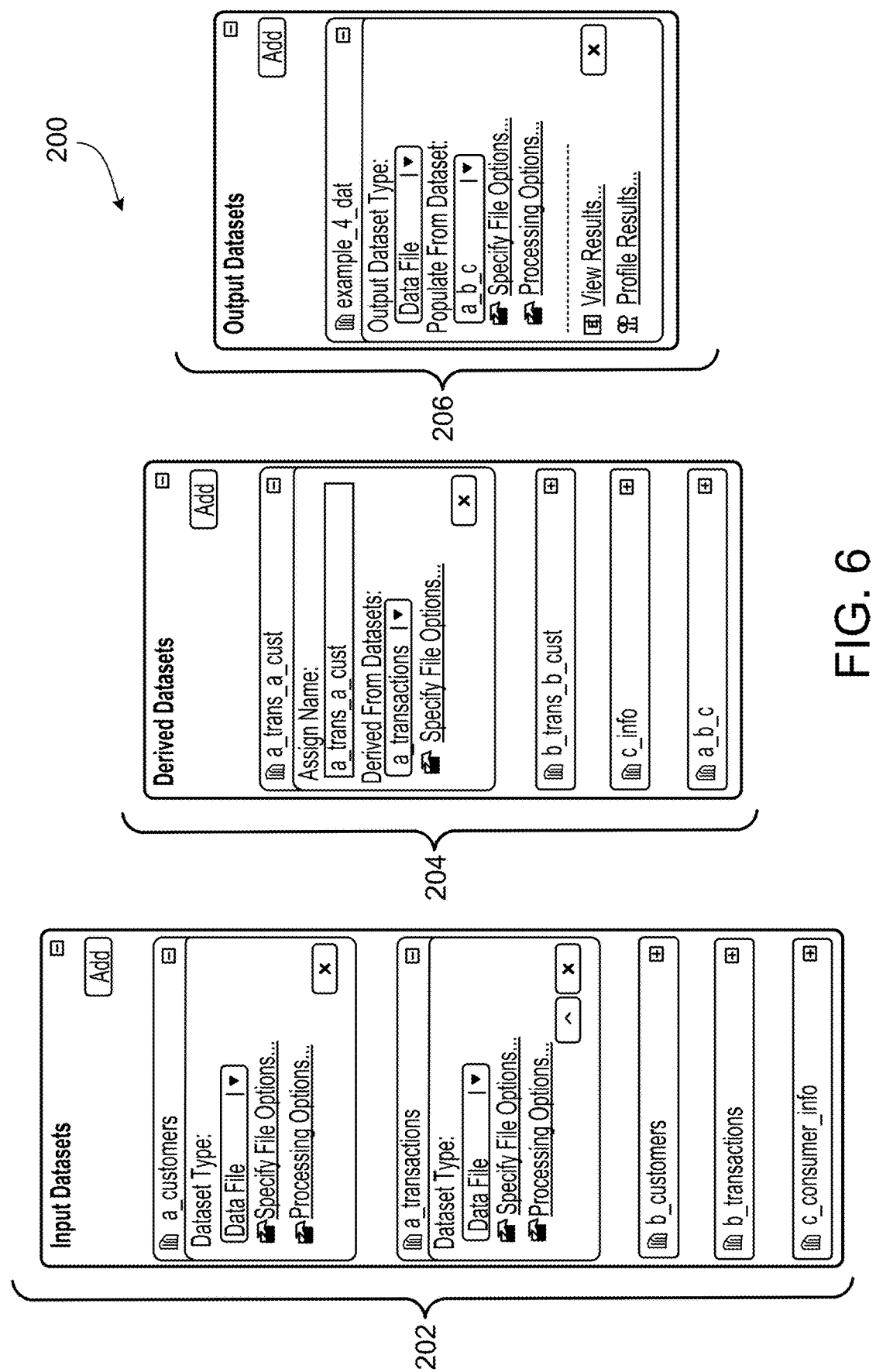
FIGS. 6-8 are each an example of a user interface for specifying parameter values for a specification.

Referring to FIG. 6, graphical user interface 200 is displayed (e.g., by the client device or the data processing system) to enable a user to configure a specification for an entity and for a dataflow graph that includes the entity. In this example, graphical user interface 200 includes portion 202 for configuration of one or more portions of a specification pertaining to input data set. Graphical user interface 200 also includes portion 204 for input of values specifying various operations (e.g., a data join) to be performed on the input data sets. Graphical user interface 200 also includes portion 206 for input of values and data specifying an output data set and storage of an output data set.

Figure 7:
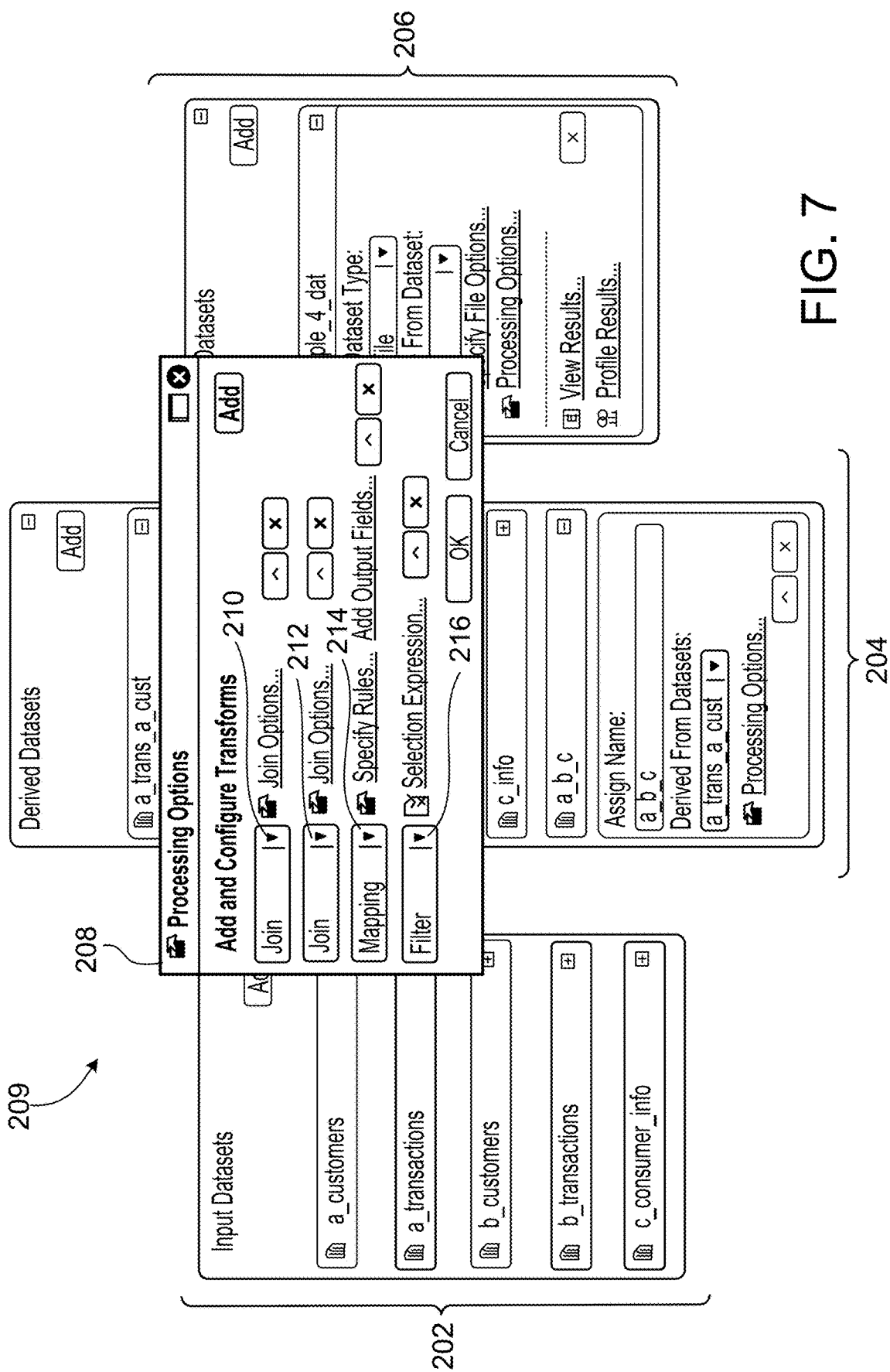

Referring to FIG. 7, graphical user interface 209 is a variation of graphical user interface 200. In this variation, overlay 208 is displayed for configuration of an entity. In this example, the entity is configured upon selection of one or more selectable portions of portion 204. In this example, overlay 208 includes configuration controls 210, 212, 214, 216 for configuration of operations (e.g., joining operations, mapping operations and filtering operations) to be performed as part of data processing. In this example, a user selects configuration control 210 to specify that a join operation is to be performed on the data records.

Figure 8:
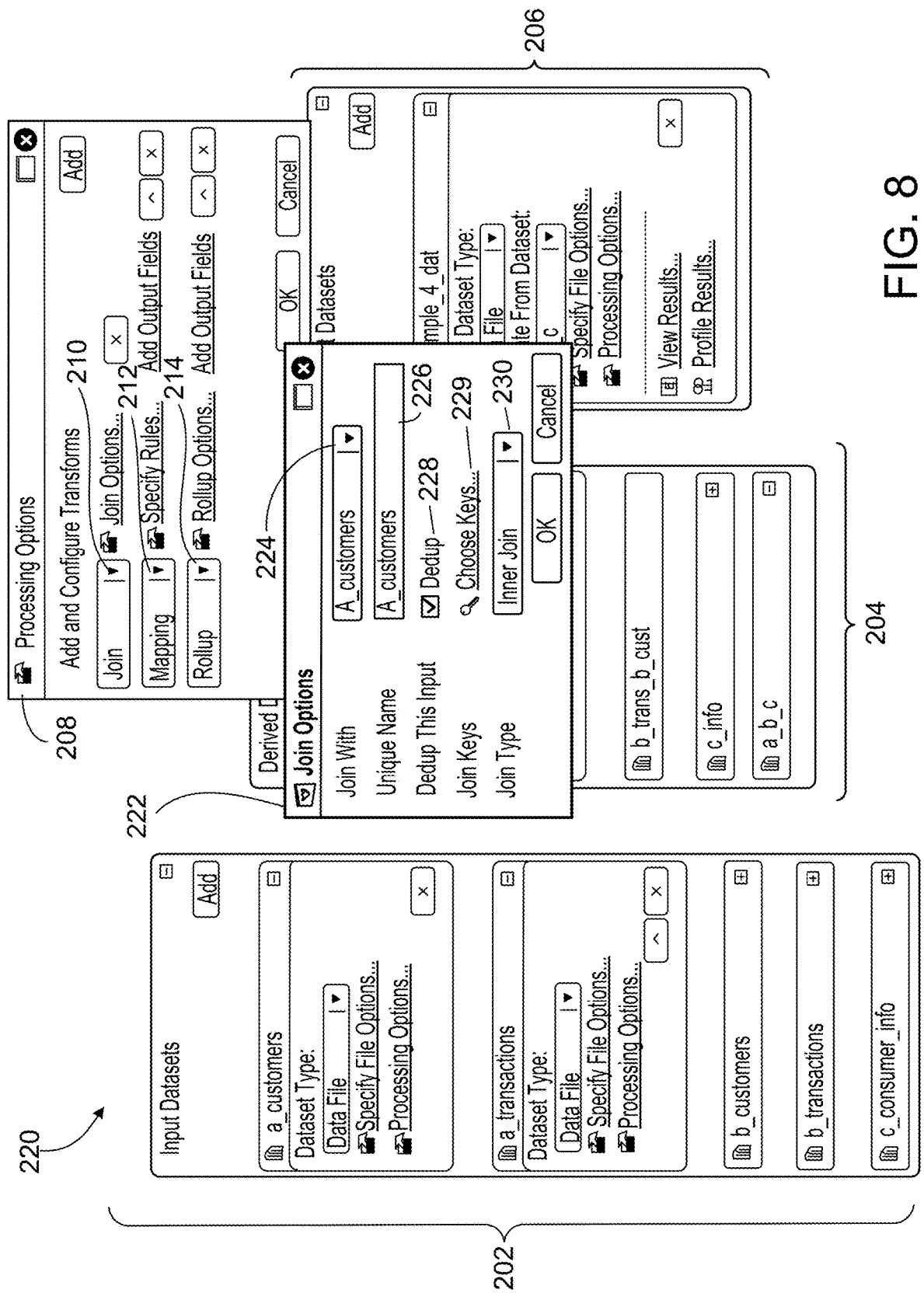

Referring to FIG. 8, graphical user interface 220 displays overlay 222 for configuration of a join operation that is included in the entity. In this example, overlay 222 is displayed upon selection of configuration control 210. In this example, overlay 222 displays controls for configuring a join operation. In particular, overlay 222 displays configuration controls 224, 226, 228, 229, 230. In this example, configuration control 224 allows a user to specify a dataset on which to perform the join. Configuration control 226 allows a user to input a name for the join operation. Configuration control 228 enables a user to specify whether the user wants to remove duplicate data records. Configuration control 229 enables a user to specify keys (i.e., unique identifiers) on which the join is performed. Configuration control 230 enables a user to specify a type a join to be performed.

Figure 9:
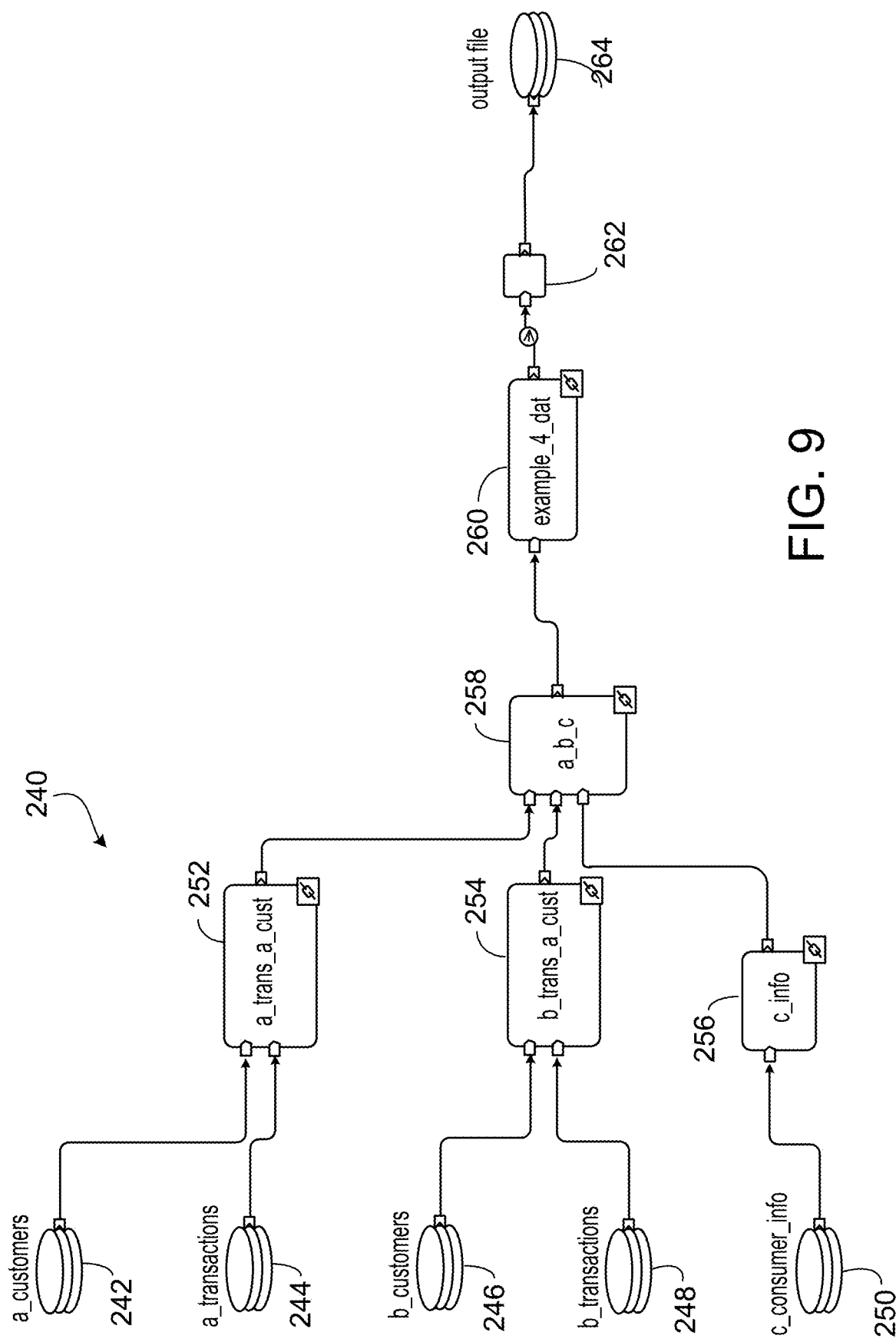

Referring to FIG. 9, the data processing system generates dataflow graph 240, e.g., based on a specification generated from specified values (e.g., those values input or otherwise specified in the user interfaces shown in FIGS. 6-8). In this example, the specification is generated using the techniques described herein, e.g., with regard to FIG. 2E. Additionally, dataflow graph 240 is generated from the specification, also using the techniques described herein.

In this example, dataflow graph 240 includes input data sources 242, 244, 246, 248, 250, entities 252, 254, 256, 258, 260, 262 and output data source 264. In this example, each of entities 252, 254, 256, 258, 260, 262 includes a dataflow graph (e.g., a dataflow graph to be included within a parent dataflow graph, such as dataflow graph 240).

Figure 10:
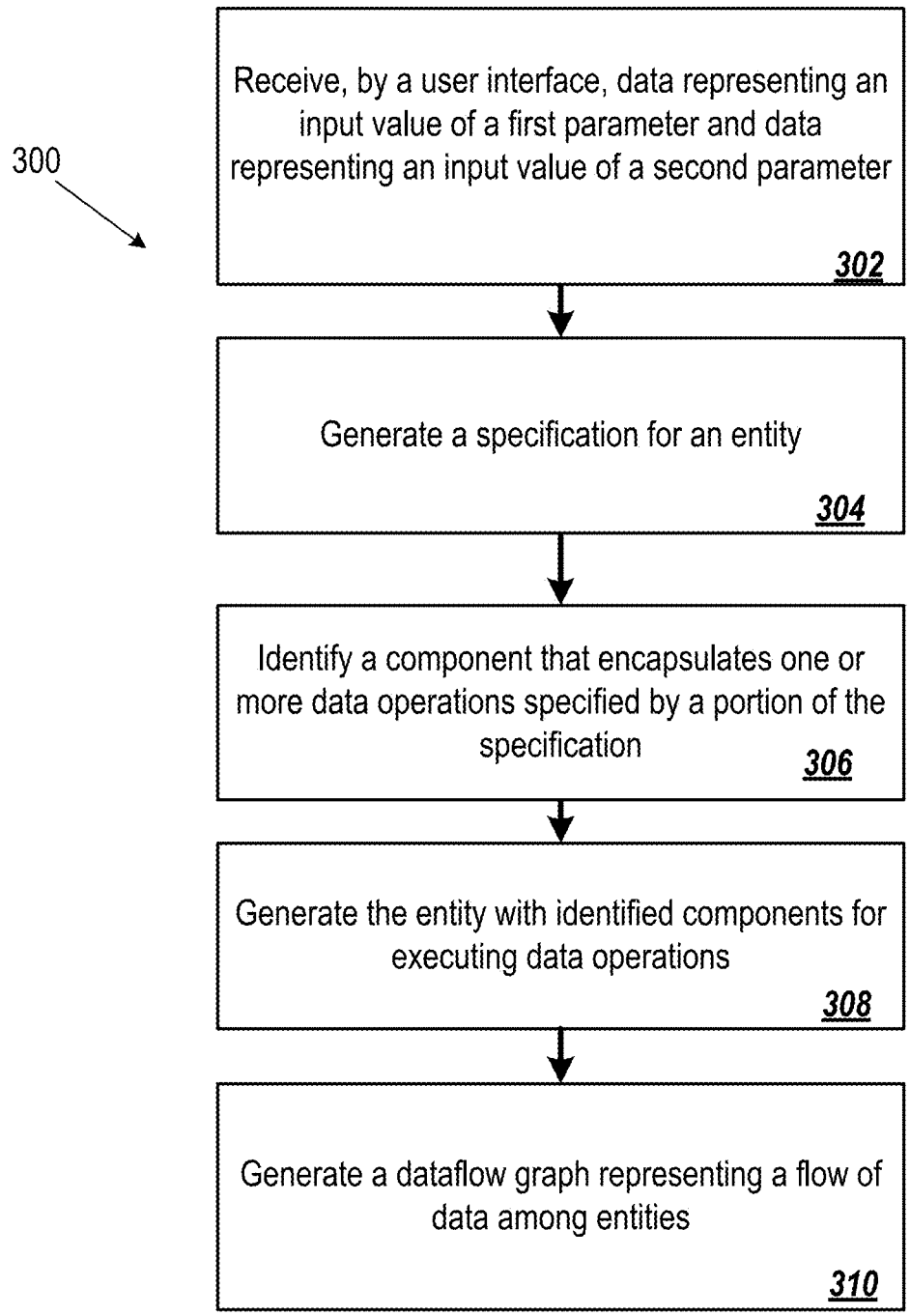
FIG. 10 is a diagram of a process of transforming a specification into an entity for generating a dataflow graph.

Referring to FIG. 10, diagram 300 depicts a process for transforming a specification into an entity for generating a dataflow graph. In operation, a system (e.g., the system 1 in FIG. 1A described herein) provides a user interface including at least a first portion for input of a value of a first parameter of an entity and at least a second portion for input of a value of a second parameter of the entity. The system receives (302) data representing the input value of the first parameter and data representing the input value of the second parameter. Optionally, the system may check the data representing the input values for compliance with predetermined criteria associated with the corresponding parameter of the entity and may output a notification to the user (e.g., via the user interface) indicating whether the input values comply with the predetermined criteria. In case the system determined that some of the input values do not comply with the predetermined criteria, the notification (such as a warning) may also include information guiding the user in inputting new one or more values for the corresponding parameter of the entity that comply with the predetermined criteria. In other words, the system may optionally provide a guided user-machine interaction process, which ensures proper operation of the entity, e.g., by ensuring that that the finally received values do comply with the predetermined criteria.

Based on the input values, the system generates (304) a specification for the entity, wherein the specification specifies a plurality of data operations for processing data records in accordance with the input values, with at least one of the data operations being specified by a portion of the received data representing the input values, and optionally with at least another one of the data operations being identified by the data processing system (e.g., automatically and without (independent of) user input—for example, based on specified rules) for inclusion in the specification to enable execution of the at least one of the data operations specified by the portion of the received data representing the input values. For each of a plurality of portions of the specification, the system identifies (306) a component that encapsulates one or more data operations specified by that portion of the specification.

The system generates (308) the entity with the identified components for executing the data operations, with a first one of the components configured to perform one or more operations in accordance with the value of the first parameter and with a second one of the components configured to perform one or more operations in accordance with the value of the second parameter. Additionally, based on entities generated with respective components identified from respective specifications, the system generates (310) a computer program or a dataflow graph representing a flow of data among the entities.

Figure 11:
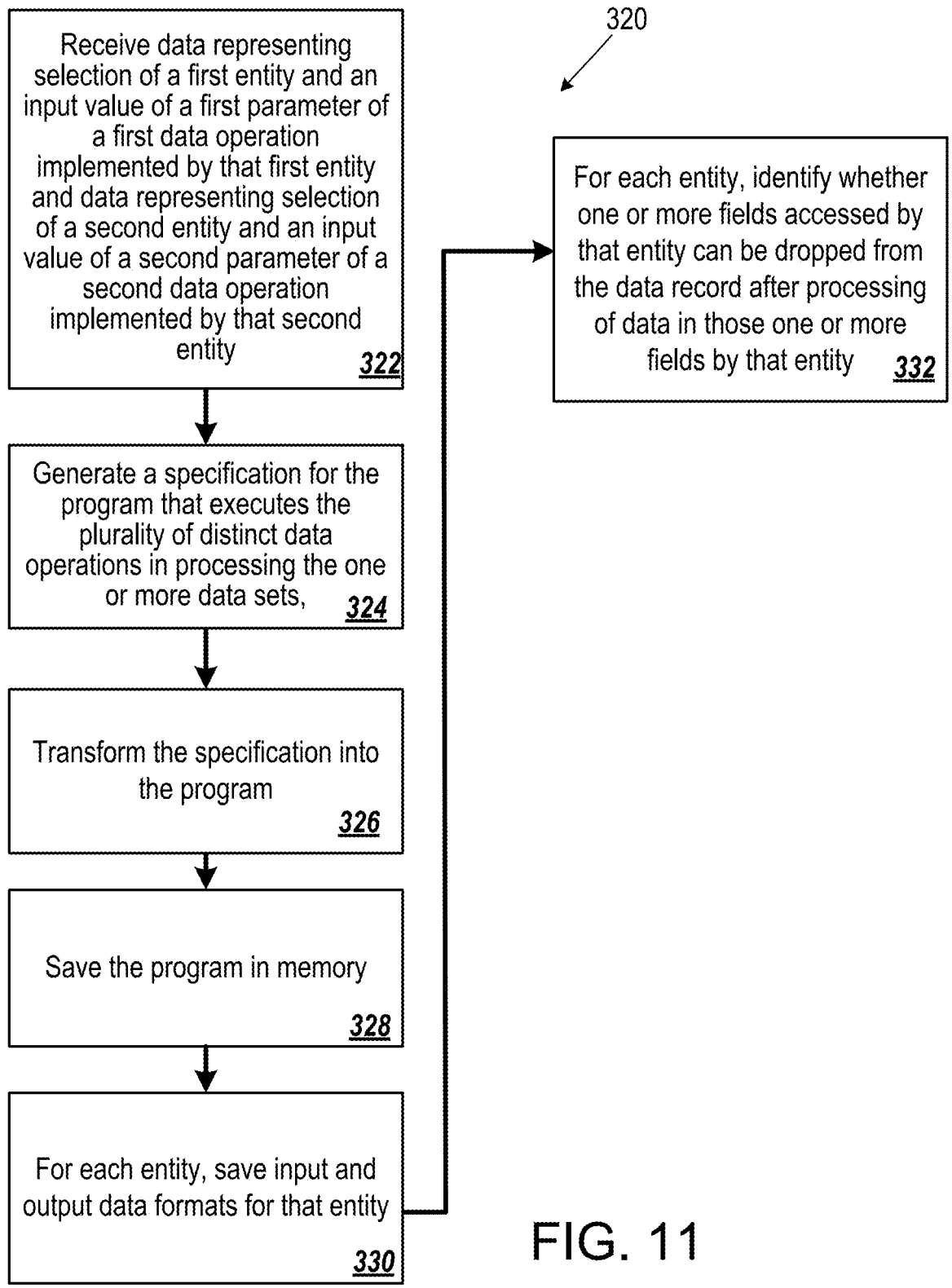
FIG. 11 is a diagram of a process for transforming a specification into a computer program.

Referring to FIG. 11, a data processing system (e.g., system 1 in FIG. 1A, data processing system 4 in FIG. 1A, or transformation environment 5 in FIG. 1A) implements process 320 in transforming a specification into a persistent computer program. Generally, persistence refers to a characteristic of state that outlives the process that created it. Generally, a computer program includes a series of coded instructions that are executable by a data processing system. In operation, the data processing system receives (322) specification data that specifies a first entity and an input value of a first parameter of a first data operation implemented by that first entity and that further specifies a second entity and an input value of a second parameter of a second data operation implemented by that second entity.

Based on the input values of the parameters of the first and second entities, the data processing system generates (324) a specification for the computer program that executes the plurality of distinct data operations in processing the one or more data sets, wherein the specification specifies that the first entity is included in the computer program and that the first entity implements at least the first data operation for processing data in accordance with at least the input value of the first parameter, wherein the specification further specifies that the second entity is included in the computer program and that the second entity implements the second data operation for processing data in accordance with at least the input value of the second parameter, and wherein optionally at least one data operation specified in the specification as being implemented by the first entity or the second entity is selected by the data processing system for inclusion in that entity independent of being specified in the user interface as a data operation for that entity.

Using the techniques described herein, the data processing system transforms (326) the specification into the computer program that executes the plurality of distinct data operations in processing the one or more data sets, wherein optionally contents of one or more portions of the computer program are distinct from input into the user interface. That is, transformation of the specification results in a new computer program that is stored in memory, e.g., for subsequent execution and/or modification. The data processing system also saves (328) the computer program in memory. This computer program is persistent and editable. Additionally, this computer programmed is saved, e.g., for execution at a later date.

For each entity, the data processing system saves (330) input and output data formats for that entity. The input data format specifies one or more fields of one or more data sets that are accessed by the entity. The output data format specifies one or more fields accessed by one or more entities occurring in the computer program after (i.e., downstream) that entity. In this example, the data processing system automatically determines the input and output data formats, e.g., using the techniques described herein in context of FIGS. 4 and 5. For determining an output data format, these techniques include identifying another entity that occurs after (i.e., downstream) the entity in the computer program, wherein the other entity and the entity are part of a dataflow through the computer program; determining one or more fields that are accessed by that other entity; determining which of the one or more fields that are accessed by that other entity are accessible by the entity; and formatting the output data format of the entity to include those one or more fields that are accessed by that other entity and that are accessible by the entity.

In this example, the data processing system also identifies (332), for each entity, whether one or more fields accessed by that entity can be dropped from a data record after processing of data (e.g., values) in those one or more fields by that entity. The data processing system does so by, for each entity in the computer program that is part of a same dataflow as one or more other entities that occur in the computer program after (i.e., downstream) the entity, determining one or more fields that are read by the entity of the computer program and that are not read by any of the one or more other entities that occur after (i.e., downstream) the entity; and following reading of those one or more fields by the entity, removing the one or more fields from further processing by the computer program.

In a variation, the data processing system provides data for a user interface for selecting, from among a plurality of entities, one or more entities for inclusion in a computer program that executes a plurality of distinct data operations in processing one or more data sets and for inputting, for each selected entity, a value of a parameter of a data operation implemented by that entity. In another variation, the data processing system provides a spreadsheet or rules editors for input of data specifying which entities to include in the computer program and parameter values for those entities.

By enabling selection of one or more entities from among multiple entities, the data processing system enables reuse of software modules and code and promotes flexibility and ease of use in generating computer programs. For example, once an entity is defined, that same entity can be reused in multiple different computer programs. Doing so reduces errors in generating computer programs. This is because a computer program can be developed via selection of already defined computer programs and code (which are error free), rather than having to start computer programming a computer program with new code. Additionally, by enabling a user to select an entity—from among multiple entities—the data processing system is able to only reveal—in a user interface—a decreased (e.g., minimum) amount of complexity necessary to configure the entity and to generate the computer program. The data processing system does so by only prompting a user for values of parameters for which user input or specification is required. Other data operations for which no user input is required are hidden from view in the user interface and are added into the specification, by the data processing computer program, as part of generation of the specification.

In this example, specification data (and/or the user input) is semantic specification of what is done (e.g., what is the result). Based on the semantic specification, the data processing system generates a logical specification (e.g., generally referred to as a specification herein) that specifies how it is done, e.g., how the result is achieved. Through this distinction between the semantic specification and the logical specification, the data processing system can implement end-to-end optimization when generating the computer program, e.g., by leaving out steps that the user has specified in the semantic specification (via a user interface or flowchart). An example optimization is when a user specifies that a particular entity performs a partition and a sort. However, if an entity preceding the particular entity is configured for a partition and a sort, the computer program is optimized to not perform the operations of partitioning and sorting—twice in a row. In this regard, creation of the graph or computer program is following recommended best practices—which the user is free from having to know about. As such, people having lesser skills can create computer programs professionally assembled.

In some examples, an entity includes computational components corresponding to nodes that are coupled by data flows corresponding to links. In this example, the computer program is a dataflow graph including entities corresponding to nodes that are coupled by data flows corresponding to links. In this example, the memory includes volatile or non-volatile memory. Additionally, in some examples, the entity includes one or more other entities.

The graph and entity configuration approach described above can be implemented to using software for execution on a computer. For instance, the software forms procedures in one or more computer programs that execute on one or more computer programmed or computer programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger computer program, for example, that provides other services related to the design and configuration of computation graphs. The nodes and elements of the graph can be implemented as data structures stored in a computer readable medium or other organized data conforming to a data model stored in a data repository.

The software may be provided on a storage medium, such as a CD-ROM, readable by a general or special purpose programmable computer or delivered (encoded in a propagated signal) over a communication medium of a network to the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments have been described. Nevertheless, it will be understood that various modifications may be made without departing from the spirit and scope of the techniques described herein. For example, some of the steps described above may be order independent, and thus can be performed in an order different from that described. Additionally, any of the foregoing techniques described with regard to a dataflow graph can also be implemented and executed with regard to a program.

It is to be understood that the foregoing description is intended to illustrate and not to limit the scope of the techniques described herein, which is defined by the scope of the appended claims. For example, a number of the function steps described above may be performed in a different order without substantially affecting overall processing. Other embodiments are within the scope of the following claims.

What is claimed is:

1. A method performed by a computer system in automatically transforming a specification into an executable computer program that processes one or more values of one or more fields in a structured data item, including:
   accessing a specification that specifies a plurality of modules to be associated with the executable computer program for processing the one or more values of the one or more fields in the structured data item;
   automatically transforming the specification into the executable computer program based on the plurality of modules, wherein the automatically transforming includes:
   for each of one or more first modules of the plurality of modules:
   identifying one or more second modules of the plurality of modules that each receives input that is at least partly based on an output of the first module, wherein fields are accessible to the first module;
   identifying which of (i) the fields accessible to the first module, correspond to (ii) one or more fields relied upon by one or more operations to be performed by the one or more second modules,
   identifying one or more fields to not include in an output data format of the first module, by:
   identifying which of the fields accessible to the first module, do not correspond to any field relied upon in any operation to be performed by any of the one or more second modules; and
   formatting the output data format of the first module such that an output of the first module specifies only one or more values of one or more identified fields corresponding to (i) one or more fields accessible to the first module, and (ii) one or more fields relied upon by the one or more operations to be performed by the one or more second modules, wherein the output data format does not specify the one or more fields that are not relied on by any operation to be performed by any of the one or more second modules; and
   saving, in persistent memory, the executable computer program, with the saved, executable computer program specifying the formatted output data format for each of the one or more first modules.

2. The method of claim 1, wherein contents of one or more portions of the executable computer program are distinct from the specification and are generated automatically without user input.

3. The method of claim 1, wherein the executable computer program is persistent and editable.

4. The method of claim 1, wherein the executable computer program is a dataflow graph, wherein each of the modules is a dataflow graph component represented by a node of the dataflow graph, and wherein dataflow graph components are coupled by data flows represented by links between nodes.

5. The method of claim 4, further including:
   accessing, in data storage system, a data structure that maps data representing portions of the specification to the dataflow graph components;
   identifying, in the data structure, an item of data representing a particular portion of the specification;
   identifying, in the data structure, which dataflow graph component is mapped to the particular portion of the specification; and
   adding the identified dataflow graph component to the dataflow graph in accordance with an order of execution of operations specified by the specification.

6. The method of claim 5, further including: identifying dependencies among the dataflow graph components; and at least partly based on these identified dependencies, specifying output data formats of the dataflow graph components.

7. The method of claim 1, further including:
   for a particular first module,
   determining that only one of one or more second modules accesses a particular one of one or more fields that are accessible to the particular first module;
   determining that the only one of the one or more second modules accesses the particular one of the one or more fields from a third module of the plurality of modules that is distinct from each of the particular first module and the one or more second modules; and
   formatting the output data format to not output one or more values for the particular one of the one or more fields accessed by the only one of the one or more second modules.

8. The method of claim 1, further including:
   providing data for display of a user interface;
   receiving, via the user interface, data representing a selection, from among a plurality of modules, of one or more modules for inclusion in the executable computer program; and
   receiving, via the user interface and for each selected module, a value of a parameter of an operation implemented by that selected one or more modules.

9. The method of claim 8, further including:
determining whether the value received via the user interface complies with a predetermined criterion associated with the operation; and
outputting a notification via the user interface indicating whether the received value complies with the predetermined criterion, wherein in case the received value is determined not to comply with the predetermined criterion, the notification including guiding information how the received value has to be changed to comply with the predetermined criterion.

10. The method of claim 8, further including:
configuring a selected module with the value of the parameter; and
storing the configured module for subsequent inclusion in and implementation by another executable computer program.

11. The method of claim 1, further including:
executing, before executing the executable computer program, first, second and third passes for each particular module of the plurality of modules to determine and save the formatted output data format for the particular module specifying which fields are required by modules downstream to the particular module and to determine and save an input data format for the particular module specifying which fields are accessible to the particular module, the executing including:
during the first pass, the particular module broadcasts, to modules upstream to the particular module, one or more messages that include data representing those one or more fields that are required by itself and by any modules downstream of the particular module, wherein the particular module that performs the broadcast is a broadcasting module and wherein the upstream modules that receive the broadcast are recipient modules;
during the second pass, the recipient modules transmit to the broadcasting module one or more messages specifying which recipient modules can provide values of the required fields; and
during the third pass, the broadcasting module analyzes the messages received from the recipient modules and, in response, the broadcasting module transmits back to the recipient modules one or more messages specifying which recipient module is responsible for transmitting which field to the broadcasting module.

12. The method of claim 1, further including:
receiving, in a data stream, the structured data item including one or more data records; and
for at least one of the one or more data records,
executing the executable computer program to process the at least one of the one or more data records; and
based on a saved output data format of at least one of the one or more first modules, removing, prior to submission of the at least one of the one or more records to one of the one or more second modules, one or more fields from the at least one of the records that are not specified as input into at least one of the one or more second modules at least partly based on the output of the first module.

13. The method of claim 1, further including:
defining, in the specification, one or more new modules; and
saving at least one of the one or more new modules to a global palette that specifies entities that are available for inclusion in other specifications.

14. The method of claim 1, further including:
defining, in the specification, one or more new modules; and
saving at least one of the one or more new modules to a local palette that specifies entities that are available for inclusion only in the specification and not in other specifications.

15. The method of claim 1, further including:
accessing a previously defined module that is included in a global palette for specification definition;
modifying one or more attributes of the previously defined module; and
performing an operation including:
storing the modified previously defined module to a local palette that specifies entities that are available for inclusion only in the specification and not in other specifications; or
saving the modified previously defined module to the global palette such that the modified previously defined module is accessible to other specifications.

16. The method of claim 1, further including:
defining, in the specification, one or more new first modules;
defining, in the specification, one or more new second modules; and
configuring at least one of the one or more new first modules to be a data source for at least one of the one or more new second modules.

17. The method of claim 1, wherein a module includes one or more other modules.

18. The method of claim 1, further including configuring a selected module with a value of a parameter; and
storing the configured module for subsequent inclusion in another program.

19. The method of claim 1, further including:
determining that only one of the one or more second modules accesses a particular one of the one or more fields that are accessible to the first module;
determining that the only one of the one or more second modules accesses the particular one of the one or more fields from a third module that is distinct from the first module; and
formatting the output data format to not output one or more values for the particular one of the one or more fields accessed by the only one of the one or more second modules.

20. The method of claim 1, wherein a structured data item includes a data record.

21. The method of claim 1, wherein identifying one or more fields to not include in the output data format of the first module, includes:
identifying which fields to remove from output of the first module, when the structured data item is processed.

22. A computer system for automatically transforming a specification into an executable computer program that processes one or more values of one or more fields in a structured data item, the computer system including:
one or more processing devices; and
one or more machine-readable hardware storage devices storing instructions that are executable by the one or more processing devices to perform operations including:
accessing a specification that specifies a plurality of modules to be associated with the executable computer program for processing the one or more values of the one or more fields in the structured data item;

automatically transforming the specification into the executable computer program based on the plurality of modules, wherein the automatically transforming includes:
for each of one or more first modules of the plurality of modules:
identifying one or more second modules of the plurality of modules that each receives input that is at least partly based on an output of the first module, wherein fields are accessible to the first module;
identifying which of (i) the fields accessible to the first module, correspond to (ii) one or more fields relied upon by one or more operations to be performed by the one or more second modules,
identifying one or more fields to not include in an output data format of the first module, by:
identifying which of the fields accessible to the first module, do not correspond to any field relied upon in any operation to be performed by any of the one or more second modules; and
formatting the output data format of the first module such that an output of the first module specifies only one or more values of one or more identified fields corresponding to (i) one or more fields accessible to the first module, and (ii) one or more fields relied upon by the one or more operations to be performed by the one or more second modules, wherein the output data format does not specify the one or more fields that are not relied on by any operation to be performed by any of the one or more second modules; and
saving, in persistent memory, the executable computer program, with the saved, executable computer program specifying the formatted output data format for each of the one or more first modules.

23. One or more machine-readable hardware storage devices for automatically transforming a specification into an executable computer program that processes one or more values of one or more fields in a structured data item, the one or more machine-readable hardware storage devices storing instructions that are executable by one or more processing devices to perform operations including:
accessing a specification that specifies a plurality of modules to be associated with the executable computer program for processing the one or more values of the one or more fields in the structured data item;
automatically transforming the specification into the executable computer program based on the plurality of modules, wherein the automatically transforming includes:
for each of one or more first modules of the plurality of modules:
identifying one or more second modules of the plurality of modules that each receives input that is at least partly based on an output of the first module, wherein fields are accessible to the first module;
identifying which of (i) the fields accessible to the first module, correspond to (ii) one or more fields relied upon by one or more operations to be performed by the one or more second modules,
identifying one or more fields to not include in an output data format of the first module, by:
identifying which of the fields accessible to the first module, do not correspond to any field relied upon in any operation to be performed by any of the one or more second modules; and
formatting the output data format of the first module such that an output of the first module specifies only one or more values of one or more identified fields corresponding to (i) one or more fields accessible to the first module, and (ii) one or more fields relied upon by the one or more operations to be performed by the one or more second modules, wherein the output data format does not specify the one or more fields that are not relied on by any operation to be performed by any of the one or more second modules; and
saving, in persistent memory, the executable computer program, with the saved, executable computer program specifying the formatted output data format for each of the one or more first modules.

24. The method of claim 1, wherein the computer program is associated with the plurality of modules by:
the computer program including at least one or more of the modules in the plurality; or
the computer program referencing at least one or more of the modules in the plurality.

25. The method of claim 1, further including:
generating a graphical user interface that includes one or more visual representations of one or more of the modules, wherein a visual representation is selectable, with selection of the visual representation causing the specification to specify that a module represented by the selected visual representation is included in the executable computer program.

26. The method of claim 25, wherein the graphical user interface further includes a selectable control, selection of which causes the specification to be automatically transformed into the executable computer program.

27. The method of claim 1, wherein the executable computer program includes an executable dataflow graph that includes nodes and links, with the nodes in the executable dataflow graph representing data processing components, and with the links in the executable dataflow graph indicating flows of data among the data processing components.

28. The method of claim 1, wherein identifying the one or more second modules includes:
determining if each of the one or more second module receives input that is at least partly based on the output of the first module; and
wherein the method further includes formatting the first module such that input is provided to the one or more second modules based on the results of that determining step.

29. The method of claim 28, further including,
identifying values of fields of the structured data item that are accessed by the first module;
wherein determining if each of the one or more second module receives input includes:
determining that input to each of the one or more second modules is at least partly based on at least one of the values of at least one of the fields of the structured data item accessed by the first module; and
wherein formatting includes:
formatting the first module to only output the at least one of the values of the at least one of the fields of the structured data item.

30. The method of claim 1, wherein formatting includes: if:
(i) the one or more fields are specified as input into the first module, and
(ii) the one or more fields are specified as input into at least one of the one or more second modules, then:
formatting an output data format of the first module such that an output of the first module specifies only one or more values of one or more identified fields corresponding to (i) one or more fields specified as input into the first module, and (ii) one or more fields specified as input into at least one of the one or more second modules.

\* \* \* \* \*